United States Patent
Hagerty et al.

(10) Patent No.: US 7,728,084 B2
(45) Date of Patent: Jun. 1, 2010

(54) POLYMERIZATION PROCESS

(75) Inventors: Robert O. Hagerty, La Porte, TX (US);
Chia S. Chee, Houston, TX (US);
Randall B. Laird, Pasadena, TX (US);
Michael A. Risch, Seabrook, TX (US);
Pradeep P. Shirodkar, Stow, OH (US);
Zerong Lin, Kingwood, TX (US); Larry L. Iaccino, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 672 days.

(21) Appl. No.: 11/628,904

(22) PCT Filed: Jun. 20, 2005

(86) PCT No.: PCT/US2005/021717

§ 371 (c)(1),
(2), (4) Date: Dec. 8, 2006

(87) PCT Pub. No.: WO2006/009977

PCT Pub. Date: Jan. 26, 2006

(65) Prior Publication Data

US 2007/0249763 A1    Oct. 25, 2007

Related U.S. Application Data

(60) Provisional application No. 60/581,596, filed on Jun. 21, 2004.

(51) Int. Cl.
*C08F 4/44* (2006.01)

(52) U.S. Cl. .................................................. 526/124.3
(58) Field of Classification Search ............... 526/124.3
See application file for complete search history.

(56) References Cited

U.S. PATENT DOCUMENTS

| 2,825,721 | A | 3/1958 | Hogan et al. |
| 2,915,513 | A | 12/1959 | Leatherman et al. |
| 2,952,669 | A | 9/1960 | Bro |
| 3,056,771 | A | 10/1962 | Aldridge et al. |
| 3,152,872 | A | 10/1964 | Scoggin et al. |

(Continued)

FOREIGN PATENT DOCUMENTS

EP    1 323 746    7/2003

(Continued)

OTHER PUBLICATIONS

U.S. Appl. No. 11/285,264, filed Nov. 22, 2005, Iaccino et al.

*Primary Examiner*—Ling-Siu Choi
*Assistant Examiner*—Sonya Wright
(74) *Attorney, Agent, or Firm*—Frank E. Reid

(57) ABSTRACT

This invention is directed to processes of making polymer in the presence of a hydrofluorocarbon or perfluorocarbon and recovering the polymer. The processes provided enable polymerization processes to be practiced with minimal fouling in the reaction system, and to the recovery of the hydrofluorocarbon and other hydrocarbons such as hydrocarbons for reuse in the process or hydrocarbon by-products from the polymerization process. The invention is particularly beneficial in the production of ethylene based polymers using Ziegler Natta catalyst systems.

54 Claims, 2 Drawing Sheets

U.S. PATENT DOCUMENTS

| | | | |
|---|---|---|---|
| 3,293,000 | A | 12/1966 | Marwil |
| 3,324,093 | A | 6/1967 | Alleman |
| 3,470,143 | A | 9/1969 | Schrage et al. |
| 3,625,658 | A | 12/1971 | Closon |
| 3,816,383 | A | 6/1974 | Stotko |
| 3,825,524 | A | 7/1974 | Wada et al. |
| 3,858,943 | A | 1/1975 | Bose et al. |
| 3,956,061 | A | 5/1976 | Young et al. |
| 4,007,321 | A | 2/1977 | Scholz et al. |
| 4,121,029 | A | 10/1978 | Irvin et al. |
| 4,187,278 | A | 2/1980 | Clifford |
| 4,199,546 | A | 4/1980 | Kirch |
| 4,372,758 | A | 2/1983 | Bobst et al. |
| 4,395,523 | A | 7/1983 | Kirch |
| 4,424,341 | A | 1/1984 | Hanson et al. |
| 4,461,889 | A | 7/1984 | Hanson |
| 4,492,787 | A | 1/1985 | Takashima et al. |
| 4,501,885 | A | 2/1985 | Sherk et al. |
| 4,589,957 | A | 5/1986 | Sherk et al. |
| 4,613,484 | A | 9/1986 | Ayres et al. |
| 4,632,976 | A | 12/1986 | Asanuma et al. |
| 4,690,804 | A | 9/1987 | Rohlfing |
| 4,737,280 | A | 4/1988 | Hanson |
| 4,794,151 | A | 12/1988 | Mueller-Mall et al. |
| 5,183,866 | A | 2/1993 | Hottovy |
| 5,207,929 | A | 5/1993 | Sung et al. |
| 5,292,863 | A | 3/1994 | Wang |
| 5,391,656 | A | 2/1995 | Campbell et al. |
| 5,455,314 | A | 10/1995 | Burns et al. |
| 5,565,175 | A | 10/1996 | Hottovy et al. |
| 5,575,979 | A | 11/1996 | Hanson |
| 5,597,892 | A | 1/1997 | Hanson |
| 5,624,878 | A | 4/1997 | Devore et al. |
| 5,780,565 | A | 7/1998 | Clough et al. |
| 6,204,344 | B1 | 3/2001 | Kendrick et al. |
| 6,239,235 | B1 | 5/2001 | Hottovy et al. |
| 6,534,613 | B2 | 3/2003 | Ford et al. |
| 7,449,530 | B2 * | 11/2008 | Hagerty et al. .............. 526/206 |
| 7,491,776 | B2 * | 2/2009 | Hagerty et al. .............. 526/135 |
| 2003/0199645 | A1 | 10/2003 | Kendrick et al. |

FOREIGN PATENT DOCUMENTS

| | | | |
|---|---|---|---|
| WO | 00/58374 | * | 10/2000 |
| WO | WO00/58374 | | 10/2000 |
| WO | WO2005/113610 | | 12/2005 |
| WO | WO2005/113615 | | 12/2005 |
| WO | WO2006/002132 | | 1/2006 |
| WO | WO2006/009942 | | 1/2006 |
| WO | WO2006/009944 | | 1/2006 |
| WO | WO2006/009945 | | 1/2006 |
| WO | WO2006/009946 | | 1/2006 |
| WO | WO2006/009949 | | 1/2006 |
| WO | WO2006/009951 | | 1/2006 |
| WO | WO2006/009976 | | 1/2006 |
| WO | WO2006/009977 | | 1/2006 |
| WO | WO2006/009979 | | 1/2006 |
| WO | WO2006/009980 | | 1/2006 |
| WO | WO2006/009981 | | 1/2006 |
| WO | WO2006/019494 | | 2/2006 |
| WO | WO2006/025917 | | 3/2006 |
| WO | WO2006/028549 | | 3/2006 |
| WO | WO2006/083303 | | 8/2006 |

* cited by examiner

Comonomer Input vs. Density (Comonomer Incorporation) for Hydrocarbon vs. HFC

Fouling vs. Density

Polymerization in Hexane

Polymerization in HFC-245fa

US 7,728,084 B2

POLYMERIZATION PROCESS

CROSS REFERENCE TO RELATED APPLICATIONS

This application claims the benefit of Provisional Application No. 60/581,596 filed Jun. 21, 2004, the disclosure of which is fully incorporated herein by reference.

PRIORITY CLAIM

This application is the national phase entry into the United States Patent Office of international application number PCT/US2005/021717 filed Jun. 20, 2005, which claims benefit of and priority to U.S. Provisional Patent application Ser. No. 60/581,596 filed Jun. 21, 2004.

FIELD OF THE INVENTION

This invention relates to a slurry polymerization process for making a polymer product. In particular, this invention relates to a slurry polymerization process to produce ethylene-based polymers using a Ziegler-Natta catalyst system and a fluorinated hydrocarbon as at least a portion of the diluent.

BACKGROUND OF THE INVENTION

Polymerization generally involves polymerization of one or more monomers to make a polymeric product. The polymerization reaction can be carried out using a wide variety of reactors, catalysts, and a wide variety of monomer feeds. Often, liquids, diluents or solvents are used in these polymerization reaction processes for various reasons such as to increase the efficiency of the polymerization reaction and recovery of polymer product.

In many polymerization processes for the production of polymer, a polymerization effluent is formed which is a slurry of particulate polymer solids suspended in a liquid medium, ordinarily the reaction diluent and unreacted monomers. A typical example of such a process in a loop reactor is disclosed in Hogan and Bank's U.S. Pat. No. 2,825,721, the disclosure of which is incorporated herein by reference. Variations and improvements of such a process in a loop reactor are described in U.S. Pat. Nos. 2,915,513, 3,152,872, 3,293,000, 3,324,093, 3,625,658, 3,816,383, 3,858,943, 3,956,061, 4,007,321, 4,121,029, 4,199,546, 4,372,758, 4,395,523, 4,424,341, 4,461,889, 4,501,885, 4,589,957, 4,613,484, 4,632,976, 4,690,804, 4,737,280, 4,794,151, 5,183,866, 5,207,929, 5,292,863, 5,391,656, 5,455,314, 5,565,175, 5,575,979, 5,597,892, 6,204,344, and 6,239,235, the disclosures of which are fully incorporated herein by reference.

Typical examples of such a process in a stirred tank reactor are disclosed in U.S. Pat. Nos. 3,825,524, 4,187,278, and 4,492,787, the disclosures of which is incorporated herein by reference. Variations and improvements of such a process in stirred tank slurry reactor systems are known to those skilled in the art.

In most commercial scale operations, it is desirable to separate the polymer and the liquid medium comprising an inert diluent and unreacted monomers in such a manner that the liquid medium is not exposed to contamination so that the liquid medium can be recycled to the polymerization zone with minimal if any purification. The liquid medium used in slurry polymerization processes is typically a saturated hydrocarbon such as isobutane or hexane. Although such diluents are not reactive in the polymerization process, the operating window (i.e. temperature and pressure) under which the polymerization process may be operated is limited by fouling in the reactor caused by agglomeration of the polymer solids in the slurry or deposition of polymer on the wall of the reactor making it impossible to recover the polymer product.

Within the conventional operating window, a particularly favored technique that has been used heretofore is that disclosed in the Scoggin et al, U.S. Pat. No. 3,152,872, more particularly the embodiment illustrated in conjunction with FIG. 2 of that patent. In such processes the reaction diluent, dissolved monomers, and catalyst are circulated in a loop reactor wherein the pressure of the polymerization reaction is about 100 to 700 psia (689 to 4826 kPa). The produced solid polymer is also circulated in the reactor. A slurry of polymer and the liquid medium is collected in one or more settling legs of the slurry loop reactor from which the slurry is periodically discharged to a flash chamber wherein the mixture is flashed to a low pressure such as about 20 psia (138 kPa). Other preferred methods for recovery of polymer product and recirculation of diluent back in to the polymerization process are shown in U.S. Pat. No. 6,204,344 to Kendrick et al. and U.S. Pat. No. 6,239,235 to Hottovy et al. The continuous withdrawal of slurry from the reactor instead of the intermittent withdrawal method permits operation of the reactors at a higher solids content which in turn leads to economically desirable higher polymer production rate for the same reactor volume. These methods also reduce the cost of diluent recovery and recirculation by utilizing a two-stage flash process wherein the first flash is performed at a pressure and temperature permitting the diluent to be reliquefied by heat exchange without the need for compression. These systems are limited in that the maximum comonomer incorporation or minimum polymer product density is limited by fouling of the polymer product in the reactor.

An example of a polymerization process that incorporates the use of a diluent other than a saturated hydrocarbon is shown in U.S. Pat. No. 3,470,143 to Schrage et al. Specifically, the Schrage patent discloses a laboratory scale polymerization reaction that incorporates the use of a fluorinated organic carbon compound as the diluent. Schrage discloses preparation of a boiling-xylene soluble polymer in a slurry which comprises polymerizing at least one ethylenically unsaturated hydrocarbon monomer to an amorphous elastomer in a reaction zone which comprises employing as a polymerization medium a fluorinated organic carbon compound.

EP 1 323 746 shows loading of biscyclopentadienyl catalyst onto a silica support in perfluorooctane and thereafter the prepolymerization of ethylene at room temperature.

U.S. Pat. No. 3,056,771 discloses polymerization of ethylene using $TiCl_4/(Et)_3Al$ in a mixture of heptane and perfluoromethylcyclohexane, presumably at room temperature.

U.S. Pat. No. 5,624,878 discloses the polymerization using "constrained geometry metal complexes" of titanium and zirconium.

There are always needs for improved polymerization processes. In particular, it would be advantageous in slurry polymerization processes using Ziegler-Natta catalysts to provide expanded operating limits in terms of pressures and temperatures and expanded product slates including lower density products than previously made in such processes and the ability to increase comonomer incorporation into a polymer chain at constant comonomer input rate. It would be further advantageous to improve such processes by providing more efficient separation of polymer product from the diluent.

SUMMARY OF THE INVENTION

The invention is directed to a process for polymerizing 75 weight % or more ethylene (based on the total weight of the ethylene and comonomer) and optionally one or more comonomer(s) in the presence of a Ziegler-Natta catalyst system and a diluent to form a slurry of polymer solids, wherein the diluent comprises a fluorinated hydrocarbon.

According to another embodiment of the invention, the polymer product has a melting temperature of greater than or equal to 75° C.

According to another embodiment of the invention, the polymer product has a heat of fusion greater than or equal to 10 J/g.

According to another embodiment of the invention, the polymer product has crystallinity derived from ethylene incorporation of greater than or equal to 10%.

According to another embodiment of the invention, the one or more comonomers contain olefinic unsaturation and are capable of insertion polymerization. Alternatively, the one or more comonomers are selected from linear, branched, or ring-containing olefins having up to 30 carbon atoms, and combinations thereof.

According to one embodiment of the invention, the diluent comprises a mixture of at least one saturated hydrocarbon and at least one fluorinated hydrocarbon wherein the mixture has a density in the range of from 0.2 g/cc less than to 0.2 g/cc greater than the density of the polymer.

In any of the embodiments described herein the materials stripped or flashed off may be passed through activated carbon to remove all or part of the fluorinated hydrocarbon.

Other embodiments of the invention are defined by any two or more of the above limitations in combination. Any of the above embodiments can use a single catalyst system or multiple catalysts in a mixed catalyst system.

DETAILED DESCRIPTION OF THE INVENTION

Figure 1:
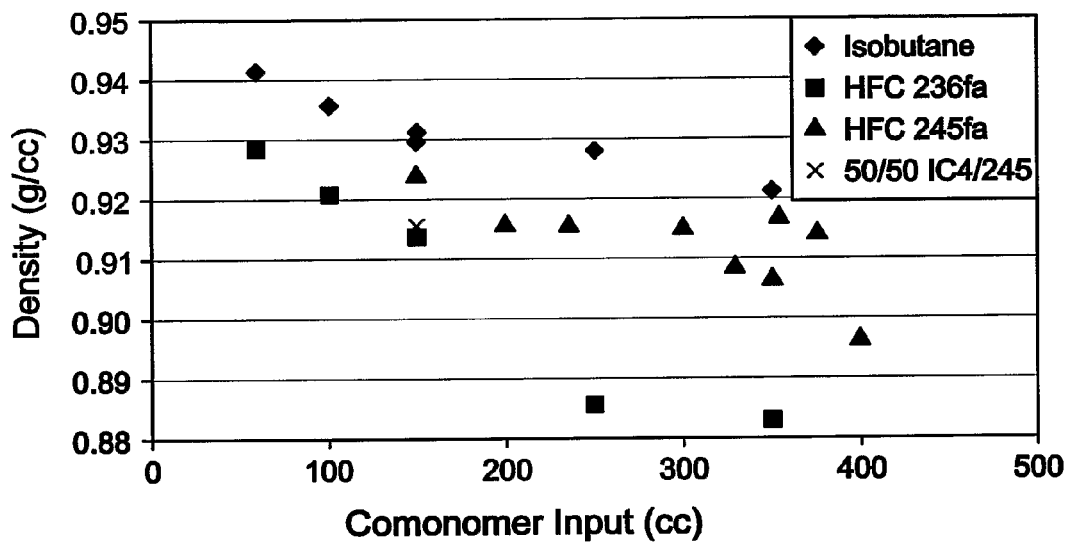
FIG. 1 shows the comonomer input to the process versus comonomer incorporation for HFC vs. hydrocarbon diluent.

The invention is directed to a process for polymerizing 75 weight % or more ethylene (based on the total weight of the ethylene and comonomer) and optionally one or more comonomer(s) in the presence of a Ziegler-Natta catalyst system and a diluent to form a slurry of polymer solids, wherein the diluent comprises a fluorinated hydrocarbon.

According to one embodiment of the invention, the diluent comprises a mixture of at least one saturated hydrocarbon and at least one fluorinated hydrocarbon wherein the mixture has a density in the range of from 0.2 g/cc less than to 0.2 g/cc greater than the density of the polymer, alternatively from 0.1 g/cc less than to 0.1 g/cc greater than the density of the polymer, alternatively from 0.05 g/cc less than to 0.05 g/cc greater than the density of the polymer.

According to another embodiment of the invention, ethylene comprises 75 weight % or more of the total weight of ethylene and comonomer, alternatively 85 weight % or more, alternatively 90 weight % or more, alternatively 95 weight % or more. Under steady state operation, the amount of ethylene in the feed in the overall feed to a reactor (i.e. consumed in the reaction and excluding any recycle of monomer) can be considered equal to the weight percent ethylene in the polymer product.

According to another embodiment of the invention, the polymer product has a melting temperature of greater than or equal to 75° C., alternatively greater than or equal to 95° C., alternatively greater than or equal to 110° C., alternatively greater than or equal to 125° C.

According to another embodiment of the invention, the polymer product has a heat of fusion greater than or equal to 10 J/g, alternatively greater than or equal to 40 J/g, alternatively greater than or equal to 70 J/g, alternatively greater than or equal to 100 J/g, alternatively greater than or equal to 130 J/g.

According to another embodiment of the invention, the polymer product has crystallinity derived from ethylene incorporation of greater than or equal to 10%, alternatively greater than or equal to 20%, alternatively greater than or equal to 30%, alternatively greater than or equal to 40%, alternatively greater than or equal to 50%.

According to another embodiment of the invention, the one or more comonomers contain olefinic unsaturation and are capable of insertion polymerization. Alternatively, the one or more comonomers are selected from linear, branched, or ring-containing olefins having up to 30 carbon atoms, and combinations thereof. Alternatively, the one or more comonomers selected from linear or branched $C_3$ to $C_{20}$ alpha olefins. Alternatively, the one or more comonomers selected from linear $C_3$ to $C_8$ alpha olefins. Alternatively, the one or more comonomers include at least one polyene. Alternatively, the one or more comonomers are selected from hydrocarbons, polar moieties, and mixtures thereof. Examples of polar comonomers include, but are not limited to vinyl acids, alcohols, esters, and the like. Preferred examples include alkylmethacrylates, alkylacrylates, alkylmethacrylic acids and alkylacrylic acids. Even more preferable examples of suitable monomers include vinyl acetate, acrylic acid, methacrylic acid, methacrylate, ethyhnethacrylate, methylmethacrylate, ethylacrylate and methylacrylate.

According to another embodiment of the invention, the Ziegler-Natta catalyst system is supported, and can further comprise an activator of alumoxane.

In one embodiment, the process of this invention is directed toward a slurry polymerization process of one or more olefin monomers having from 2 to 30 carbon atoms, preferably 2 to 12 carbon atoms, and more preferably 2 to 8 carbon atoms. The invention is particularly well suited to the polymerization of two or more olefin monomers of ethylene, propylene, butene-1, pentene-1, 4-methyl-pentene-1, hexene-1, octene-1 and decene-1.

Other monomers useful in the process of the invention include ethylenically unsaturated monomers, diolefins having 4 to 18 carbon atoms, conjugated or nonconjugated dienes, polyenes, vinyl monomers and cyclic olefins. Non-limiting monomers useful in the invention include butadiene, norbornene, norbornadiene, isobutylene, vinylbenzocyclobutane, styrenes, alkyl substituted styrene, ethylidene norbornene, isoprene, dicyclopentadiene and cyclopentene.

In a preferred embodiment of the process of the invention, a copolymer of ethylene is produced, where with ethylene, and a comonomer having at least one alpha-olefin having from 4 to 15 carbon atoms, preferably from 4 to 12 carbon atoms, and most preferably from 4 to 8 carbon atoms, are polymerized in a slurry process.

In another embodiment of the process of the invention, ethylene and propylene is polymerized with at one additional comonomer, optionally one of which may be a diene, to form a terpolymer.

According to one embodiment of the invention, the diluent comprises a mixture of at least one saturated hydrocarbon and at least one fluorinated hydrocarbon wherein the mixture has a density in the range of from 0.2 g/cc less than to 0.2 g/cc greater than the density of the polymer, alternatively from 0.1 g/cc less than to 0.1 g/cc greater than the density of the polymer, alternatively from 0.05 g/cc less than to 0.05 g/cc greater than the density of the polymer.

According to another embodiment of the invention, the diluent comprises a mixture of at least one saturated hydrocarbon and at least one fluorinated hydrocarbon wherein the saturated hydrocarbon comprises more than 1 weight percent of the mixture, alternatively more than 5 weight percent of the mixture, alternatively more than 10 weight percent of the mixture, alternatively more than 1 volume percent of the mixture, alternatively more than 5 volume percent of the mixture, alternatively more than 10 weight percent of the mixture.

According to another embodiment of the invention, the at least one fluorinated hydrocarbon is present in the reaction mixture in a molar ratio of at least 100:1 relative to the Ziegler-Natta transition metal component, alternatively at least 500:1.

According to another embodiment of the invention, the process can be carried out in a loop reactor or a stirred tank reactor. Withdrawal of polymer product from the reactor can be accomplished by concentrating the solids for intermittent withdrawal or by continuous withdrawal of a portion of the slurry.

Other embodiments of the invention are defined by any two or more of the above limitations in combination.

The polymer made by the process of this invention can be made at particularly low densities with minimal fouling of the reactor system, thus resulting in improved operation efficiency, with low loss of heat transfer and extended run periods. Also, the invention provides for the production of polymers not typically capable of being produced in a slurry process thereby expanding the commercial grade slate from a particular process.

In addition to the production and recovery of polymer from the process, the invention provides for higher recovery of hydrocarbons that are recovered along with the polymer. Such hydrocarbons include non-polymerized materials, for example liquids, diluents, solvents, and unreacted monomers. Many of these non-polymerized materials are recovered at high efficiency and reused in the polymerization process.

Comonomers

Typical comonomers include those having from 2 to 30 carbon atoms, preferably 2 to 12 carbon atoms, and more preferably 2 to 8 carbon atoms. Useful monomers include linear, branched or cyclic olefins; linear branched or cyclic alpha olefins; linear, branched or cyclic diolefins; linear branched or cyclic alpha-omega olefins; linear, branched or cyclic polyenes; linear branched or cyclic alpha olefins. Particularly preferred monomers include one or more of ethylene, propylene, butene-1, pentene-1, 4-methyl-pentene-1, hexene-1, octene-1, decene-1, 3-methyl-pentene-1, norbornene, norbornadiene, 3,5,5-trimethyl-1-hexene, 5-ethyl-1-nonene, vinyl norbornene, ethylidene norbornene monomers. Particularly preferred is ethylene, either alone or with one or more co-monomers, to produce a homopolymer or a copolymer.

Cyclic containing monomers that can be used in the process of this invention include aromatic-group-containing monomers containing up to 30 carbon atoms and non aromatic cyclic group containing monomers containing up to 30 carbon atoms. Suitable aromatic-group-containing monomers comprise at least one aromatic structure, preferably from one to three, more preferably a phenyl, indenyl, fluorenyl, or naphthyl moiety.

The aromatic group-containing monomer further comprises at least one polymerizable double bond such that after polymerization, the aromatic structure will be pendant from the polymer backbone. The aromatic-group containing monomer may further be substituted with one or more hydrocarbyl groups including but not limited to $C_1$ to $C_{10}$ alkyl groups. Additionally two adjacent substitutions may be joined to form a ring structure. Preferred aromatic-group-containing monomers contain at least one aromatic structure appended to a polymerizable olefinic moiety. Particularly preferred aromatic monomers include styrene, alpha-methylstyrene, para-alkylstyrenes, vinyltoluenes, vinylnaphthalene, allyl benzene, and indene, especially styrene, paramethyl styrene, 4-phenyl-1-butene and allyl benzene. Suitable non-aromatic cyclic group containing monomers preferably have at least one polymerizable olefinic group that is either pendant on the cyclic structure or is part of the cyclic structure. The cyclic structure may also be further substituted by one or more hydrocarbyl groups such as, but not limited to, $C_1$ to $C_{10}$ alkyl groups. Preferred non-aromatic cyclic group containing monomers include vinylcyclohexane, vinylcyclohexene, vinylnorbornene, ethylidene norbornene, cyclopentadiene, cyclopentene, cyclohexene, cyclobutene, vinyladamantane and the like.

Preferred diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). It is further preferred that the diolefin monomers be selected from alpha, omega-diene monomers (i.e. di-vinyl monomers). More preferably, the diolefin monomers are linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene or higher ring containing diolefins with or without substituents at various ring positions.

In a preferred embodiment, the polymer produced herein is an ethylene homopolymer or copolymer. In a particularly preferred embodiment, the process of this invention relates to the polymerization of ethylene and one or more $C_3$ to $C_{20}$ linear, branched or cyclic monomers, preferably one or more $C_3$ to $C_{12}$ linear or branched alpha-olefins. In a particularly preferred embodiment, the comonomer comprises at least one comonomer having from 3 to 8 carbon atoms, preferably 4 to 7 carbon atoms. Particularly, the comonomers are selected from the group consisting of propylene, butene-1, 4-methyl-pentene-1,3-methyl-pentene-1, hexene-1 and octene-1, the most preferred group being hexene-1, butene-1 and octene-1.

In another embodiment, ethylene is polymerized with at least two different comonomers to form a terpolymer. The preferred comonomers are a combination of alpha-olefin monomers having 4 to 10 carbon atoms, more preferably 4 to 8 carbon atoms, optionally with at least one diene monomer. The preferred terpolymers include the combinations such as ethylene/butene-1/hexene-1, ethylene/propylene/butene-1, ethylene/propylene/hexene-1, ethylene/propylene/norbornene and the like.

In a preferred embodiment, ethylene is present in the polymer at 50 mole % to 99.9 mole %, more preferably 70 to 98 mole %, more preferably 80 to 95 mole %. One or more comonomer(s) are present in the polymer at 0.1 mole % to 50 mole %, based upon the moles of all monomers present, more preferably 2 to 30 mole %, more preferably 5 to 20 mole %.

In another embodiment, the polymer produced herein comprises:

ethylene present at from 40 to 100 mole %, alternatively 50 to 90 mole %, more alternatively 60 to 80 mole %, and a second olefin monomer present at from 5 to 60 mole %, alternatively 10 to 40 mole %, more alternatively 20 to 40 mole %, and optionally a third olefin monomer present at from 0 to 10 mole %, more alternatively from 0.5 to 5 mole %, more alternatively 1 to 3 mole %.

Diluent

The diluents used in this invention are beneficial in producing highly useful polymer products. Use of the diluents can also provide polymer processes having reduced fouling, higher overall efficiencies and/or reduced environmental emissions. The diluents of the invention are preferably compositions added to the reaction process that reduce the concentration of one or more active materials in the process to achieve the desired and beneficial effect. Preferably, the diluent is a hydrocarbon having little to no solvent power. More preferably, the diluent comprises a halogen containing, most preferably fluorinated hydrocarbon compound having little to no solvent power with respect to the polymer product. The fluorinated hydrocarbons may be used individually or as mixtures, and can be included in a mixture with non-fluorinated hydrocarbon diluents if desired.

According to this invention, fluorinated hydrocarbons are interchangeably referred to as hydrofluorocarbons or hydrofluorocarbon compounds or HFCs. These compounds have at least one carbon atom and at least one fluorine atom. The fluorinated hydrocarbon can be a perfluorinated hydrocarbon or the fluorinated hydrocarbon can optionally include one or more hydrogen atom(s). A perfluorinated hydrocarbon is a fluorocarbon in which the hydrogen directly attached to the carbon atom(s) is completely replaced by fluorine. See *Hawley's Condensed Chemical Dictionary*, Thirteenth Edition, Van Nostrand Renhold, 1997. Examples of preferred perfluorocarbons include linear branched or cyclic, $C_1$ to $C_{40}$ perfluoroalkanes.

In one embodiment, the fluorinated hydrocarbons are represented by the formula:

$$C_xH_yF_z \quad \text{(XII)}$$

wherein x is an integer from 1 to 40, alternatively from 1 to 30, alternatively from 1 to 20, alternatively from 1 to 10, alternatively from 1 to 6, alternatively from 2 to 20 alternatively from 3 to 10, alternatively from 3 to 6, most preferably from 1 to 3, wherein y is greater than or equal 0 and z is an integer and at least one, more preferably, y and z are integers and at least one. In a preferred embodiment, z is 2 or more.

In one embodiment, a mixture of fluorinated hydrocarbons are used as the diluent in the process of the invention, preferably a mixture of a perfluorinated hydrocarbon and a fluorinated hydrocarbon, and more preferably a mixture of a fluorinated hydrocarbon. In yet another embodiment, the fluorinated hydrocarbon is balanced or unbalanced in the number of fluorine atoms in the fluorinated hydrocarbon compound.

Non-limiting examples of fluorinated hydrocarbons include fluoromethane; difluoromethane; trifluoromethane; fluoroethane; 1,1-difluoroethane; 1,2-difluoroethane; 1,1,1-trifluoroethane; 1,1,2-trifluoroethane; 1,1,1,2-tetrafluoroethane; 1,1,2,2-tetrafluoroethane; 1,1,1,2,2-pentafluoroethane; 1-fluoropropane; 2-fluoropropane; 1,1-difluoropropane; 1,2-difluoropropane; 1,3-difluoropropane; 2,2-difluoropropane; 1,1,1-trifluoropropane; 1,1,2-trifluoropropane; 1,1,3-trifluoropropane; 1,2,2-trifluoropropane; 1,2,3-trifluoropropane; 1,1,1,2-tetrafluoropropane; 1,1,1,3-tetrafluoropropane; 1,1,2,2-tetrafluoropropane; 1,1,2,3-tetrafluoropropane; 1,1,3,3-tetrafluoropropane; 1,2,2,3-tetrafluoropropane; 1,1,1,2,2-pentafluoropropane; 1,1,1,2,3-pentafluoropropane; 1,1,1,3,3-pentafluoropropane; 1,1,2,2,3-pentafluoropropane; 1,1,2,3,3-pentafluoropropane; 1,1,1,2,2,3-hexafluoropropane; 1,1,1,2,3,3-hexafluoropropane; 1,1,1,3,3,3-hexafluoropropane; 1,1,2,2,3,3-hexafluoropropane; 1,2,3,3,3,-hexafluoropropane; 1,1,1,2,2,3,3-heptafluoropropane; 1,1,1,2,3,3,3-heptafluoropropane; 1-fluorobutane; 2-fluorobutane; 1,1-difluorobutane; 1,2-difluorobutane; 1,3-difluorobutane; 1,4-difluorobutane; 2,2-difluorobutane; 2,3-difluorobutane; 1,1,1-trifluorobutane; 1,1,2-trifluorobutane; 1,1,3-trifluorobutane; 1,1,4-trifluorobutane; 1,2,2-trifluorobutane; 1,2,3-trifluorobutane; 1,3,3-trifluorobutane; 2,2,3-trifluorobutane; 1,1,1,2-tetrafluorobutane; 1,1,1,3-tetrafluorobutane; 1,1,1,4-tetrafluorobutane; 1,1,2,2-tetrafluorobutane; 1,1,2,3-tetrafluorobutane; 1,1,2,4-tetrafluorobutane; 1,1,3,3-tetrafluorobutane; 1,1,3,4-tetrafluorobutane; 1,1,4,4-tetrafluorobutane; 1,2,2,3-tetrafluorobutane; 1,2,2,4-tetrafluorobutane; 1,2,3,3-tetrafluorobutane; 1,2,3,4-tetrafluorobutane; 2,2,3,3-tetrafluorobutane; 1,1,1,2,2-pentafluorobutane; 1,1,1,2,3-pentafluorobutane; 1,1,1,2,4-pentafluorobutane; 1,1,1,3,3-pentafluorobutane; 1,1,1,3,4-pentafluorobutane; 1,1,1,4,4-pentafluorobutane; 1,1,2,2,3-pentafluorobutane; 1,1,2,2,4-pentafluorobutane; 1,1,2,3,3-pentafluorobutane; 1,1,2,4,4-pentafluorobutane; 1,1,3,3,4-pentafluorobutane; 1,2,2,3,3-pentafluorobutane; 1,2,2,3,4-pentafluorobutane; 1,1,1,2,2,3-hexafluorobutane; 1,1,1,2,2,4-hexafluorobutane; 1,1,1,2,3,3-hexafluorobutane, 1,1,1,2,3,4-hexafluorobutane; 1,1,1,2,4,4-hexafluorobutane; 1,1,1,3,3,4-hexafluorobutane; 1,1,1,3,4,4-hexafluorobutane; 1,1,1,4,4,4-hexafluorobutane; 1,1,2,2,3,3-hexafluorobutane; 1,1,2,2,3,4-hexafluorobutane; 1,1,2,2,4,4-hexafluorobutane; 1,1,2,3,3,4-hexafluorobutane; 1,1,2,3,4,4-hexafluorobutane; 1,2,2,3,3,4-hexafluorobutane; 1,1,1,2,2,3,3-heptafluorobutane; 1,1,1,2,2,4,4-heptafluorobutane; 1,1,1,2,2,3,4-heptafluorobutane; 1,1,1,2,3,3,4-heptafluorobutane; 1,1,1,2,3,4,4-heptafluorobutane; 1,1,1,2,4,4,4-heptafluorobutane; 1,1,1,3,3,4,4-heptafluorobutane; 1,1,2,2,3,3,4-octafluorobutane; 1,1,1,2,2,3,4,4-octafluorobutane; 1,1,1,2,3,3,4,4-octafluorobutane; 1,1,1,2,2,4,4,4-octafluorobutane; 1,1,1,2,3,4,4,4-octafluorobutane; 1,1,1,2,2,3,3,4-nonafluorobutane; 1,1,1,2,2,3,4,4,4-nonafluorobutane; 1-fluoro-2-methylpropane; 1,1-difluoro-2-methylpropane; 1,3-difluoro-2-methylpropane; 1,1,1-trifluoro-2-methylpropane; 1,1,3-trifluoro-2-methylpropane; 1,3-difluoro-2-(fluoromethyl)propane; 1,1,1,3-tetrafluoro-2-methylpropane; 1,1,3,3-tetrafluoro-2-methylpropane; 1,1,3-trifluoro-2-(fluoromethyl)propane; 1,1,1,3,3-pentafluoro-2- methylpropane; 1,1,3,3-tetrafluoro-2-(fluoromethyl)propane; 1,1,1,3-tetrafluoro-2-(fluoromethyl)propane; fluorocyclobutane; 1,1-difluorocyclobutane; 1,2-difluorocyclobutane; 1,3-difluorocyclobutane; 1,1,2-trifluorocyclobutane; 1,1,3-trifluorocyclobutane; 1,2,3-trifluorocyclobutane; 1,1,2,2-tetrafluorocyclobutane; 1,1,3,3-tetrafluorocyclobutane; 1,1,2,2,3-pentafluorocyclobutane; 1,1,2,3,3-pentafluorocyclobutane; 1,1,2,2,3,3-hexafluorocyclobutane; 1,1,2,2,3,4-hexafluorocyclobutane; 1,1,2,3,3,4-hexafluorocyclobutane; 1,1,2,2,3,3,4-heptafluorocyclobutane. In addition to those fluorinated hydrocarbons described herein, those fluorinated hydrocarbons described in Raymond Will, et. al., CEH Marketing Report, Fluorocarbons, Pages 1-133, by the Chemical Economics Handbook-SRI International, April 2001, which is fully incorporated herein by reference, are included. In another embodiment, the fluorocarbon is not a perfluorinated C4 to C10 alkane.

In another embodiment, the commercially available fluorinated hydrocarbons useful in the process of the invention include HFC-236fa having the chemical name 1,1,1,3,3,3-hexafluoropropane, HFC-134a having the chemical name 1,1,1,2-tetrafluoroethane, HFC-245fa having the chemical name 1,1,1,3,3-Pentafluoropropane, HFC-365mfc having the chemical name 1,1,1,3,3-pentafluorobutane, R-318 having the chemical name octafluorocyclobutane, and HFC-43-10mee having the chemical name 2,3-dihydrodecafluoropentane and/or HFC-365mfc, all of these are commercially available fluorinated hydrocarbons.

In another embodiment, the fluorocarbon is not a perfluorinated C4 to C10 alkane. In another embodiment, the fluorocarbon is not a perfluorinated hydrocarbon. In another embodiment, the fluorocarbon is not perfluorodecalin, perfluoroheptane, perfluorohexane, perfluoromethylcyclohexane, perfluorooctane, perfluoro-1,3-dimethylcyclohexane, perfluorononane, fluorobenzene, or perfluorotoluene. In a particularly preferred embodiment, the fluorocarbon consists essentially of hydrofluorocarbons.

In another embodiment the fluorocarbon is present at more than 1 weight %, based upon the weight of the fluorocarbon and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In another embodiment the fluorocarbon is present at more than 1 weight %, based upon the weight of the fluorocarbons, monomers and any hydrocarbon solvent present in the reactor, preferably greater than 3 weight %, preferably greater than 5 weight %, preferably greater than 7 weight %, preferably greater than 10 weight %, preferably greater than 15 weight %, preferably greater than 20 weight %, preferably greater than 25 weight %, preferably greater than 30 weight %, preferably greater than 35 weight %, preferably greater than 40 weight %, preferably greater than 50 weight %, preferably greater than 55 weight %, preferably greater than 60 weight %, preferably greater than 70 weight %, preferably greater than 80 weight %, preferably greater than 90 weight %. In the event that the weight basis is not named for the weight % fluorocarbon, it shall be presumed to be based upon the total weight of the fluorocarbons, monomers and hydrocarbon solvents present in the reactor.

In another embodiment the fluorocarbon, preferably the hydrofluorocarbon, is present at more than 1 volume %, based upon the total volume of the fluorocarbon, monomers and any hydrocarbon solvent present in the reactor, preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In another embodiment the fluorocarbon is a blend of hydrofluorocarbon and perfluorocarbon, and preferably the hydrofluorocarbon is present at more than 1 volume %, based upon the total volume of the hydrofluorocarbon and perfluorocarbon present in the reactor (with the balance being made up by the perfluorocarbon), preferably greater than 3 volume %, preferably greater than 5 volume %, preferably greater than 7 volume %, preferably greater than 10 volume %, preferably greater than 15 volume %, preferably greater than 20 volume %, preferably greater than 25 volume %, preferably greater than 30 volume %, preferably greater than 35 volume %, preferably greater than 40 volume %, preferably greater than 45 volume %, preferably greater than 50 volume %, preferably greater than 55 volume %, preferably greater than 60 volume %, preferably greater than 65 volume %.

In yet another embodiment, the fluorinated hydrocarbons of the invention have a molecular weight (MW) greater than 30 a.m.u., preferably greater than 35 a.m.u., and more preferably greater than 40 a.m.u. In another embodiment, the fluorinated hydrocarbons of the invention have a MW greater than 60 a.m.u., preferably greater than 65 a.m.u., even more preferably greater than 70 a.m.u., and most preferably greater than 80 a.m.u. In still another embodiment, the fluorinated hydrocarbons of the invention have a MW greater than 90 a.m.u., preferably greater than 100 a.m.u., even more preferably greater than 135 a.m.u., and most preferably greater than 150 a.m.u. In another embodiment, the fluorinated hydrocarbons of the invention have a MW greater than 140 a.m.u., preferably greater than 150 a.m.u., more preferably greater than 180 a.m.u., even more preferably greater than 200 a.m.u., and most preferably greater than 225 a.m.u. In an embodiment, the fluorinated hydrocarbons of the invention have a MW in the range of from 30 a.m.u. to 1000 a.m.u., preferably in the range of from 100 a.m.u. to 500 a.m.u., more preferably in the range of from 100 a.m.u. to 300 a.m.u., and most preferably in the range of from about 100 a.m.u. to about 250 a.m.u.

In yet another embodiment, the fluorinated hydrocarbons of the invention have normal boiling point in the range of from about −100° C. to 100° C. or the polymerization temperature (whichever is lower), preferably a polymerization temperature of about 70° C. to about 115° C., preferably the normal boiling point of the fluorinated hydrocarbons is in the range of from −80° C. to about 90° C., more preferably from about −60° C. to about 85° C., and most preferably from about −50° C. to about 80° C. In an embodiment, the fluorinated hydrocarbons of the invention have normal boiling point greater than −50° C., preferably greater than −50° C. to less than −10° C. In a further embodiment, the fluorinated hydrocarbons of the invention have normal boiling point less than −5° C., preferably greater than −5° C. to less than −20° C. In one embodiment, the fluorinated hydrocarbons of the invention have normal boiling point greater than −10° C., preferably greater than −10° C. to about 60° C.

In another embodiment, the fluorinated hydrocarbons of the invention have a liquid density @ 20° C. (g/cc) of 2.0 g/cc or less, preferably 1.6 cc/g or less, and most preferably 1.5 g/cc or less. In one embodiment, the fluorinated hydrocarbons of the invention have a liquid density @ 20° C. (g/cc) less than 1.6 g/cc, preferably less than 1.55 g/cc, and most preferably less than 1.50 g/cc. In one embodiment, the fluorinated hydrocarbons of the invention have a liquid density @ 20° C. (g/cc) less than 1.50 g/cc, preferably less than 1.45, and most preferably less than 1.40 g/cc.

In one embodiment, the fluorinated hydrocarbons of the invention have a ΔH Vaporization at the normal boiling point as measured by standard calorimetry techniques in the range between 100 kJ/kg to less than 500 kJ/kg, preferably in the range of from 110 kJ/kg to less than 450 kJ/kg, and most preferably in the range of from 120 kJ/kg to less than 400 kJ/kg.

In another preferred embodiment, the diluent used in the invention comprises any combination of two or more fluorinated hydrocarbons having the aforementioned MW, normal boiling point, ΔH Vaporization, and liquid density values and ranges. In a preferred embodiment, the fluorinated hydrocarbons useful in the process of the invention have a MW greater than 30 a.m.u., preferably greater than 40 a.m.u., and a liquid density less than 2.0 g/cc, preferably less than 1.8 g/cc. In yet another preferred embodiment, the fluorinated hydrocarbons useful in the process of the invention have a liquid density less than 1.9 g/cc, preferably less than 1.8 g/cc, and a normal boiling point greater than −100° C., preferably greater than −30° C. up to the polymerization temperature of the process, which is as high as 100° C., preferably less than 90° C., and more preferably less than 85° C., and most preferably less than 80° C. In one embodiment, the fluorinated hydrocarbons useful in the process of the invention have a MW greater than 30 a.m.u., preferably greater than 40 a.m.u., and a ΔH Vaporization in the range of from 100 kj/kg to less than 500 kj/kg, and optionally a liquid density less than 2.0 g/cc, preferably less than 1.8 g/cc. In yet another embodiment, the fluorinated hydrocarbons useful in the process of the invention have a liquid density less than 1.9 g/cc, preferably less than 1.8 g/cc, and a normal boiling point greater than −50° C., preferably greater than −30° C. up to the polymerization temperature of the process, which is as high as 100° C., preferably less than 90° C., and more preferably less than 85° C., and most preferably less than 80° C., and optionally a ΔH Vaporization in the range of from 120 kj/kg to less than 400 kj/kg.

In yet another embodiment, the diluent includes one or more fluorinated hydrocarbon(s), alone or in combination, with one or more other typical inert hydrocarbon fluid(s) (non-fluorinated) are used in the process of the invention. Preferably, the hydrocarbon solvent is an aliphatic or aromatic hydrocarbon fluids. Examples of suitable, preferably inert, hydrocarbon fluids are readily volatile liquid hydrocarbons, which include, for example, saturated hydrocarbons containing from 1 to 50, preferably 3 to 20, carbon atoms. Preferred examples include propane, n-butane, isobutane (MW of 58.12 a.m.u., a liquid density of 0.55 g/cc, and normal boiling point as above described of −11.75), n-pentane, isopentane (MW of 72.15 a.m.u., a liquid density of 0.62 g/cc, and normal boiling point of 27.85), neopentane, n-hexane, cyclohexane, isohexane, octane, and other saturated C6 to C8 hydrocarbons. Preferred hydrocarbon fluids also include alkanes (preferably C1 to C8 alkanes), such as propane, isobutane, mixed butanes, hexane, pentane, isopentane, desulphurized light virgin naphtha, cyclohexane and octane, are preferred. In one embodiment, the diluent further comprises at least one C1 to C40 alkane, alternatively C2 to C8 alkane.

According to another embodiment of the invention, the diluent comprises a mixture of at least one inert hydrocarbon fluid (non-fluorinated) and at least one fluorinated hydrocarbon, wherein the mixture has a density @ 20° C. (g/cc) in the range of from 0.2 g/cc less than to 0.2 g/cc greater than the density of the polymer, alternatively from 0.1 g/cc less than to 0.1 g/cc greater than the density of the polymer, alternatively from 0.05 g/cc less than to 0.05 g/cc greater than the density of the polymer.

In another embodiment the fluorocarbon is present at more than 5 weight %, based upon the weight of the fluorocarbon and any hydrocarbon solvent present in the reactor, preferably greater than 7 weight %, preferably greater than 10 weight %, preferably greater than 15 weight %.

In another embodiment, the diluent is selected based upon its solubility or lack thereof in a particular polymer being produced. Preferred diluents have little to no solubility in the polymer. Solubility in the polymer is measured by forming the polymer into a film of thickness between 50 and 100 microns, then soaking it in diluent (enough to cover the film) for 4 hours at the relevant desired temperature in a sealed container or vessel. The film is removed from the diluent, exposed for 90 seconds to evaporate excess diluent from the surface of the film, and weighed. The mass uptake is defined as the percentage increase in the film weight after soaking. The diluent or diluent mixture is selected so that the polymer has a mass uptake of less than 4 weight %, preferably less than 3 weight %, more preferably less than 2 weight %, even more preferably less than 1 weight %, and most preferably less than 0.5 weight %.

Ideally, the fluorocarbon is inert to the polymerization reaction. By "inert to the polymerization reaction" is meant that the fluorocarbon does not react chemically with the, monomers, catalyst system or the catalyst system components. (This is not to say that the physical environment provided by an fluorocarbons does not influence the polymerization reactions, in fact, it may do so to some extent, such as affecting activity rates. However, it is meant to say that the fluorocarbons are not present as part of the catalyst system.)

In a preferred embodiment, the diluent(s) or mixtures thereof, preferably, the fluorinated hydrocarbon(s) or mixtures thereof, are selected such that the polymer melting temperature Tm is reduced (or depressed) by not more than 15° C. by the presence of the diluent. The depression of the polymer melting temperature ΠTm is determined by first measuring the melting temperature of a polymer by differential scanning calorimetry (DSC), and then comparing this to a similar measurement on a sample of the same polymer that has been soaked with the diluent. In general, the melting temperature of the soaked polymer will be lower than that of the dry polymer. The difference in these measurements is taken as the melting point depression ΠTm. It is well known to those in the art that higher concentrations of dissolved materials in the polymer cause larger depressions in the polymer melting temperature (i.e. higher values of ΠTm). A suitable DSC technique for determining the melting point depression is described by, P. V. Hemmingsen, "Phase Equilibria in Polyethylene Systems", Ph.D Thesis, Norwegian University of Science and Technology, March 2000, which is incorporated herein by reference. (A preferred set of conditions for conducting the tests are summarized on Page 112 of this reference.) The polymer melting temperature is first measured with dry polymer, and then repeated with the polymer immersed in liquid (the diluent to be evaluated). As described in the reference above, it is important to ensure that the second part of the test, conducted in the presence of the liquid, is done in a sealed container so that the liquid is not flashed during the test, which could introduce experimental error. In one embodiment, the Tm is less than 12° C., preferably less than 10° C., preferably less than 8° C., more preferably less than 6° C., and most preferably less than 4° C. In another embodiment, the measured ΔTm is less than 5° C., preferably less than 4° C., more preferably less than 3° C., even more preferably less than 2° C., and most preferably less than 1° C.

Ziegler Natta Catalyst System

The polymer is formed in a catalytic process using a Ziegler Natta catalyst system. The use of the Ziegler Natta catalyst system provides the capability of producing a polymer product with little to no reactor fouling, and producing a polymer product that is very low in density.

The catalyst system of the invention will typically include a Ziegler Natta catalyst compound and preferably an activator compound. In another preferred embodiment, the catalyst system will include one or more support materials and/or one or more co-catalysts. The components of the catalyst system are chosen to be capable of being utilized in the polymerization process selected. The catalysts, co-catalysts and activator compounds can include the support materials. As used herein, the notation numbering scheme for the Periodic Table Groups are used as set out in *Chemical And Engineering News*, 63(5), 27 (1985).

Ziegler Natta Transition Metal Component

The use of Ziegler Natta type catalysts are particularly preferred in this invention. Ziegler Natta type catalysts are catalyst compositions that incorporate Ziegler Natta transition metal components. Typically, the transition metal component is a compound of a Group IVB, VB, or VIB metal. The transition metal component is generally represented by any one of the formulas: $TrX_{4-q}(OR^1)_q$, $TrX_{4-q}R^2_q$, $VOX_3$, and $VO(OR^1)_3$, wherein Tr is a Group IVB, VB, or VIB metal, preferably a Group IVB or VB metal, and more preferably titanium, vanadium or zirconium, q is 0 or a number equal to or less than 4, X is a halogen and $R^1$ is an alkyl group, aryl group or cycloalkyl group having from 1 to 20 carbon atoms, and $R^2$ is an alkyl group, aryl group, aralkyl group, substituted aralkyl group, and the like. The aryl, aralkyls, and substituted aralkyls contain from 1 to 20 carbon atoms, preferably 1 to 10 carbon atoms. In an preferred embodiment of the formula $TrX_{4-q}R^2_q$, the hydrocarbyl group, $R^2$, does not contain an H atom in the beta position. Illustrative, but non-limiting examples of alkyl groups are methyl, neo-pentyl, 2,2-dimethylbutyl, 2,2-dimethylhexyl; aryl groups such as phenyl, naphthyl; aralkyl groups such as benzyl; cycloalkyl groups such as 1-norbornyl. Mixtures of these transition metal compounds can be employed if desired.

Illustrative examples of titanium compounds include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_6H_{13})_2Cl_2$, $Ti(OC_{12}H_{25})Cl_3$, $Ti(OC_2H_5)_2Br_2$, $Ti(OC_8H_{17})_2Br_2$ and $TiCl_3 \cdot \frac{1}{3}AlCl_3$. In some embodiments, however, it is preferred that the catalyst system not comprise titanium tetrachloride, particularly not the combination of $TiCl_4$ and aluminum alkyl (such as triethylaluminum), particularly when the fluorocarbon is a perfluorocarbon. In situations where the catalyst is titanium tetrachloride, particularly the combination of $TiCl_4$ and aluminum alkyl (such as triethylaluminum) the fluorocarbon is preferably a hydrofluorocarbon. In another embodiment, the catalyst is not a free radical initiator, such as a peroxide.

Illustrative examples of vanadium compounds include $VCl_4$, $VOCl_3$, $VO(OC_2H_5)_3$, and $VO(OC_4H_9)_3$. Illustrative examples of zirconium compounds include $ZrCl_4$, $ZrCl_3(OC_2H_5)$, $ZrCl_2(OC_2H_5)_2$, $ZrCl(OC_2H_5)_3$, $Zr(OC_2H_5)_4$, $ZrCl_3(OC_4H_9)$, $ZrCl_2(OC_4H_9)_2$, and $ZrCl(OC_4H_9)_3$.

Mixtures of the transition metal compounds may be usefully employed, no restriction being imposed on the number of transition metal compounds that may be incorporated. Any halogenide and alkoxide transition metal compound or mixtures thereof can be usefully employed.

Support

In one embodiment of the invention, the catalyst composition of the invention comprises a support material. The support material can be any solid, particularly porous support material such as talc or inorganic oxides, or resinous support materials such as a polyolefin. Preferably, the support material is an inorganic oxide.

Examples of suitable inorganic oxide materials include Group IIA, IIIA, IVA or IVB metal oxides such as silica, alumina, silica-alumina and mixtures thereof. Other inorganic oxides that may be employed either alone or in combination with the silica, alumina or silica-alumina are magnesia, titania, zirconia, and the like. Other suitable support materials, however, can be employed, for example, polyolefins such as polyethylene.

In another embodiment, the inorganic oxide support is any particulate oxide or mixed oxide that has been thermally or chemically dehydrated such that it is substantially free of moisture. Thermal treatment is preferably carried out in vacuum or while purging with a dry inert gas such as nitrogen at a temperature of about 100° C. to about 1000° C., and preferably from about 300° C. to about 800° C. Pressure considerations are not critical. The duration of the thermal treatment can be from about 1 to about 24 hours; however, shorter or longer times can be employed provided equilibrium is established with the surface hydroxyl groups.

Chemical dehydration as an alternative method of dehydration of the metal oxide support material can advantageously be employed. Chemical dehydration converts water and hydroxyl groups on the oxide surface to inert species. Useful chemical agents include, for example, $SiCl_4$, and chlorosilanes, such as trimethylchlorosilane, dimethyaminotrimethylsilane and the like. Chemical dehydration is accomplished by slurrying the inorganic particulate material, such as, for example, silica in an inert low boiling hydrocarbon, such as, for example, hexane. During the chemical dehydration reaction, the silica should be maintained in a moisture and oxygen-free atmosphere. To the silica slurry is then added a low boiling inert hydrocarbon solution of the chemical dehydrating agent, such as, for example, dichlorodimethylsilane. Preferably, the temperature ranges during chemical dehydration reaction are from about 25° C. to about 120° C.; however, higher and lower temperatures can be employed. Preferably, the temperature will be about 50° C. to about 70° C.

The chemical dehydration procedure should be allowed to proceed until sufficient moisture is removed from the particulate support material as indicated by cessation of gas evolution. Normally, the chemical dehydration reaction will be allowed to proceed from about 30 minutes to about 16 hours, preferably 1 to 5 hours. Upon completion of the chemical dehydration, the solid particulate material is filtered under a nitrogen atmosphere and washed one or more times with a dry, oxygen-free inert hydrocarbon solvent. The wash solvents, as well as the diluents employed to form the slurry and the solution of chemical dehydrating agent, can be any suitable inert hydrocarbon. Illustrative of such hydrocarbons are heptane, hexane, toluene, isopentane and the like.

The specific particle size, surface area, pore volume, and number of surface hydroxyl groups characteristic of the inorganic oxide are not critical to its utility in the practice of the invention. It is preferred, however, that the inorganic oxides have an average particle size in the range of from about 30 to 600 microns, preferably from about 30 to 100 microns; a surface area of from about 50 to 1,000 square meters per gram, preferably from about 100 to 400 square meters per gram; and a pore volume of from about 0.5 to 3.5 cc per gram; preferably from about 0.5 to 2 cc per gram.

Cocatalysts

In a preferred embodiment of the invention the catalyst system includes a cocatalyst composition. The cocatalyst composition comprises an organic compound of a metal of Groups 1 through 3 of the Periodic Table.

Examples of organic metal compounds employed as cocatalysts include organic compounds of lithium, magnesium, calcium, zinc, and aluminum. Organic aluminum compounds are preferred. Particularly preferred organic aluminum compounds are those represented by the general formula $R_nAlX_{3-n}$ (wherein R denotes an alkyl group or an aryl group having from 1-18 carbon atoms, X denotes a halogen atom, an alkoxy group or a hydrogen atom, and n denotes a desired number in the range of 1 to 3). Examples of organic aluminum compounds include alkyl aluminum compounds such as trialkyl aluminum, dialkyl aluminum monohalide, monoalkyl aluminum dihalide, alkyl aluminum sesquihalide, dialkyl aluminum monoalkoxide, and dialkyl aluminum monohydride, respectively having 1 to 18 carbon atoms, preferably 2 to 6 carbon atoms, and mixtures and complex compounds thereof. Illustrative examples of such organic aluminum compounds include trialkyl aluminums such as trimethyl aluminum, triethyl aluminum, tripropyl aluminum, triisobutyl aluminum, and trihexyl aluminum, dialkyl aluminum monohalides such as dimethyl aluminum chloride, diethyl aluminum chloride, diethyl aluminum bromide, diethyl aluminum iodide, and diisobutyl aluminum chloride, monoalkyl aluminum dihalides such as methyl aluminum dichloride, ethyl aluminum dichloride, methyl aluminum dibromide, ethyl aluminum dibromide, ethyl aluminum diiodide, and isobutyl aluminum dichloride, alkyl aluminum sesquihalides such as ethyl aluminum sesquichloride, dialkyl aluminum monoalkoxides such as dimethyl aluminum methoxide, diethyl aluminum ethoxide, diethyl aluminum phenoxide, dipropyl aluminum ethoxide, diisobutyl aluminum ethoxide, and diisobutyl aluminum phenoxide, and dialkyl aluminum hydrides such as dimethyl aluminum hydride, diethyl aluminum hydride, dipropyl aluminum hydride, and diisobutyl aluminum hydride.

In one embodiment, trialkyl aluminum compounds, specifically trimethyl aluminum, triethyl aluminum, and triisobutyl aluminum, are preferred. In another embodiment, trialkyl aluminum compounds are used in combination with other organic aluminum compounds such as diethyl aluminum chloride, ethyl aluminum dichloride, ethyl aluminum sesquichloride, diethyl aluminum ethoxide, or diethyl aluminum hydride. The organic aluminum compounds may be used in the form of a mixture or complex compound.

In another embodiment, the cocatalyst is an organic aluminum compound having two or more aluminum atoms linked through an oxygen atom or nitrogen atom. Examples of such an organic aluminum compounds include

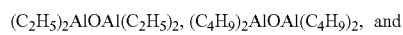

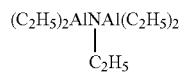

Examples of organic compounds of metals other than aluminum are diethyl magnesium, ethyl magnesium chloride, diethyl zinc, and such compounds as $LiAl(C_2H_5)_4$ and $LiAl(C_7H_{15})_4$. The ratio of organometallic compound to transition metal component will generally be in the range of from about 1 to about 100 moles of aluminum per mole of transition metal component metal on the support. The organometallic compound can be used in a suitable hydrocarbon solvent such as isopentane, hexane, or toluene.

Alkali Earth or Alkali Metal Halide Compounds

In another preferred embodiment of the invention, the catalyst composition includes one or more alkali earth or alkali metal halide compounds. Preferably, the catalyst composition includes a titanium transition metal and one or more alkali earth or alkali metal halide compounds. Such catalyst compositions include at least one alkali earth or alkali metal halide compound in an amount to dilute titanium centers (and hence increase the active centers), stabilize active titanium centers from the deactivation process, and/or enhance the chain transfer process during polymerization. Magnesium halide is a preferred alkali earth halide. Examples of magnesium halide compounds include $MgCl_2$ and $MgBr_2$. $MgCl_2$, particularly anhydrous $MgCl_2$ is preferred. In one embodiment, from about 1 to 10 moles of magnesium chloride per mole of the titanium compound are used. Other suitable alkali earth compounds include those represented by the formula $Mg(OR)_2$, wherein R is an alkyl group, preferably a $C_1$-$C_8$ alkyl group, as well as the compound $Mg(OH)Cl$.

Electron Donors

In another embodiment of the invention, the catalyst system of the invention contains at least one non-transition metal electron donor. Illustrative but non-limiting examples of electron donor compounds, known as "Lewis Bases," include aliphatic and aromatic esters, aliphatic ethers, cyclic ethers, and aliphatic ketones. Examples of preferred compounds include tetrahydrofuran, dioxane, acetone, methyl formate and diethyl ether. A particularly preferred electron donor compound is tetrahydrofuran. The molar ratio of the electron donor compound to transition metal compound, particularly titanium containing compound, ranges from about 2 to 30 moles, and more preferably from about 5 to 15 moles of electron donor compound per mole of the transition metal compound.

Surface Modification

In another embodiment of the invention, the support material is surface modified. Surface modification is preferably accomplished by treating the support material such as silica, alumina or silica-alumina with an organometallic compound having hydrolytic character. More particularly, the surface modifying agents for the support materials comprise the organometallic compounds of the metals of Group IIA and IIIA of the Periodic Table. Most preferably the organometallic compounds are selected from magnesium and aluminum organometallics and especially from magnesium and aluminum alkyls or mixtures thereof represented by the formulas $R^1MgR^2$ and $R^1R^2AlR^3$ wherein each of $R^1$, $R^2$ and $R^3$ are the same or different alkyl groups, aryl groups, cycloalkyl groups, aralkyl groups, alkoxide groups alkadienyl groups or alkenyl groups. The hydrocarbon groups $R^1$, $R^2$ and $R^3$ preferably contain from 1 to 20 carbon atoms and more preferably from 1 to 10 carbon atoms.

In one embodiment, the organometallic compound is added in a suitable solvent to a slurry of the support material. Contact of the organometallic compound in a suitable solvent and the support is preferably maintained for about 30 to 180 minutes and preferably for 60 to 90 minutes at a temperature in the range of from 20° C. to 100° C. The diluent employed in slurrying the support can be any of the solvents employed in solubilizing the organometallic compound and is preferably the same.

The amount of surface modifying agent employed in preparation of the surface modified support material can vary over a wide range. Generally the amount will be in the range of from $1 \times 10^{-6}$ moles to about $2 \times 10^{-3}$ moles of modifying agent per gram of support material. However greater or lesser amounts can be employed.

Illustrative, but non-limiting examples of magnesium compounds which may be suitably employed as a surface modifying agent for the support materials in accordance with the invention are dialkyl magnesiums such as diethylmagnesium, dipropylmagnesiums, di-isopropylmagnesium, di-n-butylmagnesium, di-isobutylmagnesium, diamylmagnesium, di-n-octylmagnesium, di-n-hexylmagnesium, di-n-decylmagnesium, and di-n-dodecylmagnesium; dicycloalkylnagnesiums, such as dicyclohexylmagnesium; diarylmagnesiums such as dibenzylmagnesium, ditolylmagnesium, and dixylylmagnesium, alkylalkoxy magnesium such as ethyl magnesium ethoxide and the like.

Illustrative, but non-limiting examples of the aluminum compounds which may be suitably employed in accordance with the invention are trialkylaluminums such as trimethylaluminum, triethylaluminum, tripropylaluminum, triisobutylaluminum, tri-n-hexylaluminum, and tri-n-octylaluminum. Preferably, the organoaluminum compounds are trimethylaluminum, triisobutylaluminum, and triethylaluminum.

Preferably, the surface modifying agents are the organomagnesium compounds which will have from one to six carbon atoms and most preferably $R^1$ and $R^2$ are different. Illustrative examples of preferred magnesium compounds include ethyl-n-propylmagnesium, ethyl-n-butylmagnesium, amyl-n-hexylmagnesium, n-butyl-sec-butylmagnesium, n-butyl-n-octylmagnesium and the like. Mixtures of hydrocarbylmagnesium compounds may be suitably employed such as, for example, di-n-butylmagnesium and ethyl-n-butylmagnesium.

Magnesium hydrocarbyl compounds are generally obtained from commercial sources as mixtures of the magnesium hydrocarbon compound with a minor amount of aluminum hydrocarbyl compound. A minor amount of aluminum hydrocarbyl is preferably present in order to facilitate solubilization and/or reduce the viscosity of the organomagnesium compound in hydrocarbon solvent. The hydrocarbon solvent usefully employed for the organomagnesium compound can be any of the well known hydrocarbon liquids, for example, hexane, heptane, octane, decane, dodecane, or mixtures thereof, as well as aromatic hydrocarbons such as benzene, toluene, xylene, etc.

A preferred organomagnesium complex with a minor amount of aluminum alkyl is represented by the formula $(R^1MgR^2)_x(R_3{}^4Al)_y$, wherein $R^1$ and $R^2$ are defined as above, $R^4$ is defined as $R^1$ and $R^2$ and x is greater than 0. The ratio of y to (y+x) is from 0 to less than 1, preferably from 0 to about 0.7 and most desirably from about 0 to 0.1. Illustrative examples of preferred organomagnesium-organoaluminum complexes are $[(n-C_4H_9)(C_2H_5)Mg][(C_2H_5)_3Al]_{0.02}$, $[(n-C_4H_9)_2Mg][(C_2H_5)_3Al]_{0.013}$, $[(n-C_4H_9)_2Mg][(C_2H_5)_3Al]_{2.0}$ and $[(n-C_6H_{13})_2Mg][(C_2H_5)_3Al]_{0.01}$.

Hydrocarbon soluble organomagnesium materials and can be prepared by conventional methods. One such method involves, for example, the addition of an appropriate aluminum alkyl to a solid dialkylmagnesium in the presence of an inert hydrocarbon solvent. The organomagnesium-organoaluminum complexes are further described in the literature, for example in U.S. Pat. Nos. 3,737,393 and 4,004,071, the detailed descriptions of each being incorporated herein by reference. However, any other suitable method for preparation of organometallic compound may be employed.

Pre-Activation

In one embodiment of the invention, supported catalyst precursors are pre-activated. Pre-activation can influence the morphology of polymer products produced by the process of the invention, in particular the bulk density of the polymers. In one embodiment, the supported catalyst precursors are pre-activated with alumoxane and/or various bulky aluminum alkyls at an activator to transition metal, particularly titanium, molar ratio of from about 0.1 to about 15, more preferably about 0.1 to 10. Pre-activation can be achieved using a hydrocarbon slurry medium typically at temperatures from about 15° C. to 30° C. with continuous mixing followed by drying at temperatures between about 30° C. to 100° C., and preferably about 50° C. to 80° C., to obtain a free-flowing solid. Illustrative but non-limiting examples of pre-activating agents include diethyl aluminum chloride (DEAC), trihexyl aluminum (TnHAL), trioctyl aluminum (TnOCTAL), methyl aluminoxane (MAO), and mixtures thereof.

Activation of the pre-activated catalyst precursor, prior to polymerization, can be accomplished by feeding a slurry of the pre-activated precursor into a suitable reactor under a nitrogen atmosphere, typically in an inert hydrocarbon diluent such as hexane, heptane, isopentane, toluene, mineral oil or other hydrocarbons known to be useful in the field, followed by the addition of an alumoxane-based cocatalyst. The cocatalyst is preferably diluted with from about 2 to 40 weight percent of a hydrocarbon solvent similar to the one used to slurry the pre-activated catalyst, and is subsequently added to the reactor as a solution. Preferably, the total molar ratio of aluminum to transition metal, preferably titanium, in the system is from 5 to 300, preferably from about 100 to about 250, and more preferably from 50 to 150, depending on the specific embodiment. Illustrative but non-limiting examples of the cocatalyst systems employed in the present invention include, but are not limited to, physical mixtures of alumoxane including polymeric methyl aluminoxane (MAO), co-polymeric isobutyl methyl aluminoxane (CoMAO), and mixtures of MAO or CoMAO along with conventional trialkyl aluminum compounds, such as triethyl aluminum (TEAL), tri-isobutyl aluminum (TIBA), trimethyl aluminum (TMA), trihexyl aluminum, diethyl aluminum chloride and mixtures thereof, said physical mixtures of alumoxane and trialkyl aluminum compounds comprising 10 to 90 mole percent alumoxane, and preferably 10 to 50 mole percent alumoxane, wherein the mole percent corresponds to the molar ratios of aluminum from each compound.

Processes

General Process Conditions and Reactor Systems

This invention pertains to any prepolymerization and/or polymerization process, and the process is suitably carried out over a wide range of temperatures and pressures. Such processes include, for example, loop slurry and stirred tank reactor processes. Either process can be used in combination with a centrifuge, a one-stage flash, a two-stage flash or any combination thereof for recovery of diluent from the polymer product and recirculation of the diluent back in to the polymerization process after any desired purification steps.

Desirably, little to no polymer "swelling" is exhibited as indicated by little or no suppression of the polymer glass transition temperature, Tg, or the melting point, Tm, and/or little or no diluent mass uptake. Thus, polymerization in the diluents of the present invention provides for high polymer concentration to be handled at low viscosity with good heat transfer, reduced reactor fouling, homogeneous polymerization and/or the convenience of subsequent reactions to be run directly on the resulting polymer mixture.

Polymerization processes according to this invention are carried out at any temperature or temperature range effective in carrying out the polymerization process. In general, effective temperatures range from about 0° C. to 200° C., preferably from about 25° C. to about 180° C., preferably from about 30° C. to 140° C., preferably from about 40° C. to 125° C., more preferably from about 50° C. to 110° C. The upper temperature will be limited to at least 1° C. below the polymer melting point.

Polymerization processes according to this invention are carried out at any pressure or pressure range effective in carrying out the polymerization process. The pressures employed may be in the range from 1 mm Hg (133 Pa) to about 3500 bar (350 MPa), preferably from 0.5 bar (50 kPa) to about 500 bar (50 MPa), more preferably from about 1 bar (100 kPa) to about 100 bar (10 MPa), and most preferably from about 5 bar to about 50 bar (5 MPa).

In one embodiment of the invention, olefin(s), preferably $C_2$ to $C_{30}$ olefin(s) or alpha-olefin(s), preferably ethylene, or combinations thereof are prepolymerized in the presence of the Ziegler-Natta catalyst systems of the invention described above prior to the main polymerization. In one embodiment, the prepolymerization process is carried out in a slurry phase at effective prepolymerization temperatures and pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and PCT Publication WO 97/44371 all of which are herein fully incorporated by reference.

The prepolymerization and/or polymerization process can be carried out in a batch or continuous process. By continuous is meant a system that operates (or is intended to operate) without interruption or cessation. For example a continuous process to produce a polymer would be one in which the reactants are continuously introduced into one or more reactors and polymer product is continually withdrawn. In a preferred embodiment any of the polymerization process of the invention is a continuous process.

The reactor used in the polymerization process of this invention, will contain sufficient amounts of the catalyst system effective to catalyze the polymerization of the monomer containing feed-stream such that a sufficient amount of polymer having desired characteristics is produced. The feed stream in one embodiment contains a total monomer concentration greater than 5 weight % (based on the total weight of the monomers, diluent, and catalyst system), preferably greater than 15 weight %, greater than 30 weight % in another embodiment. In yet another embodiment, the feed-stream will contain from 5 weight % to 50 weight % monomer concentration based on the total weight of monomer, diluent, and catalyst system (the monomer concentration should be limited sufficiently to prevent pump cavitation).

In one embodiment of the invention, hydrogen is added to the reactor for molecular weight control. As is well known to those skilled in the art, increased concentrations of hydrogen relative to the concentration of monomer(s) in the reactor cause the production of polymer of lower number average and weight, average molecular weights.

In one embodiment of the invention, a liquid process is employed, which comprises contacting olefin monomers with polymerization catalyst in an optional solvent and allowing the monomers to react for a sufficient time to produce the desired polymers. Hydrocarbon solvents suitable for the process include aliphatic and aromatic solvents. Alkanes, such as hexane, pentane, isopentane, and octane, are preferred.

Process Conditions

One embodiment of the invention incorporates the use of a slurry phase polymerization process, preferably as a continuous polymerization process. The slurry polymerization process is preferably carried out at pressures in the range of from about 1 to about 100 atmospheres, preferably in the range of from 1 to 50 atmospheres. Operating temperatures are generally in the range of from 0° C. to about 200° C., preferably from 50° C. to about 120° C. Preferably, the polymerization temperature is above room temperature (23° C.), preferably above 25° C., preferably above 27° C., preferably above 30° C., preferably above 50° C., preferably above 70° C.

In one embodiment of the slurry process, the monomers, catalyst(s), and initiator(s) are miscible in the diluent or diluent mixture, i.e., constitute a single phase, while the polymer precipitates from the diluent with good separation from the diluent. In one embodiment, a solvent or co-diluent is added to the reaction process. In a particular embodiment, an alkane having from 3 to 7 carbon atoms, preferably a branched alkane, is added. Preferred alkanes include isobutane and isohexane.

A preferred polymerization technique of the invention is referred to as a particle form polymerization, which is essentially a slurry process utilizing a supported catalyst wherein the temperature is kept below the temperature at which the polymer goes into solution. Such technique is well known in the art, and described in for instance U.S. Pat. No. 3,248,179, which is fully incorporated herein by reference. Other slurry processes include those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. Nos. 4,613,484 and 5,986,021, which are herein fully incorporated by reference. Such combinations of stirred slurry, loop slurry, or stirred and loop slurry reactors are useful for production of bimodal polymers.

In one embodiment, the reactor used in the slurry process of the invention is capable of producing greater than 2000 lbs of polymer per hour (907 kg/hr), more preferably greater than 5000 lbs/hr (2268 kg/hr), and most preferably greater than 10,000 lbs/hr (4540 kg/hr). In another embodiment the slurry reactor used in the process of the invention is capable of producing greater than 15,000 lbs of polymer per hour (6804 kg/hr), preferably greater than 25,000 lbs/hr (11,340 kg/hr) to about 100,000 lbs/hr (45,500 kg/hr).

In one embodiment, polymer granules and supported catalyst particles are present as solid particles in the slurry reactor, and the slurry diluent is a hydrofluorocarbon, one or more hydrocarbons, or mixtures thereof. In one embodiment, the concentration of solid particles in the slurry is equal to or greater than 10 volume percent. In another embodiment, the solid particles are present in the slurry at a concentration equal to or greater than 25 volume percent. In yet another embodiment, the solid particles are present in the slurry at a concentration less than or equal to 75 volume percent. In yet another embodiment, the solid particles are present in the slurry at concentrations ranging from 1 to 70 volume percent; from 5 to 70 volume percent; from 10 to 70 volume percent; from 15 to 70 volume percent; from 20 to 70 volume percent; from 25 to 70 volume percent; from 30 to 70 volume percent; or from 40 to 70 volume percent.

Reactors and Reactor Systems

One or more slurry reactors in series or in parallel may be used in this invention. Alternatively, one or more gas phase reactors my be operated either upstream or downstream of the one or more slurry reactors. Catalyst component(s) (and any activator employed) may be delivered as a solution or slurry, either separately to the reactor, activated in-line just prior to the reactor, or preactivated and pumped as an activated solution or slurry to the reactor. A preferred operation is two solutions activated in-line. For information on methods to introduce multiple catalysts into reactors, see U.S. Pat. No. 6,399,722 and WO 01/30861 A1. While these reference may emphasize gas phase reactors, the techniques described are equally applicable to other types of reactors, including continuous stirred tank reactors, slurry loop reactors and the like. Polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst component may also be added to both reactors, with one component being added to a first reactor and other components added to other reactors.

In one embodiment, a continuous flow stirred tank-type reactor is used. The reactor is generally fitted with an efficient agitation means, such as a turbo-mixer or impeller(s), an external cooling jacket and/or internal cooling tubes and/or coils, or other means of removing the heat of polymerization to maintain the desired reaction temperature, inlet means (such as inlet pipes) for monomers, diluents and catalysts (combined or separately), temperature sensing means, and an effluent overflow or outflow pipe which withdraws polymer, diluent and unreacted monomers among other things, to a holding drum or quench tank. Preferably, the reactor is purged of air and moisture. One skilled in the art will recognize proper assembly and operation. The reactors are preferably designed to deliver good mixing of the catalyst and monomers within the reactor, good turbulence across or within the heat transfer tubes or coils, and enough fluid flow throughout the reaction volume to avoid excessive polymer accumulation or separation from the diluent.

In another embodiment of the invention, a reactor capable of performing a continuous slurry process, such as disclosed in U.S. Pat. No. 5,417,930, herein incorporated by reference, is used. A reactor pump impeller is employed in the reactor and can be of the up-pumping variety or the down-pumping variety.

The order of contacting the monomer feed-stream, catalyst, initiator, and diluent may be variable. In one embodiment, the initiator and catalyst are pre-complexed by mixing together in the selected diluent for a prescribed amount of time ranging from 0.01 second to 10 hours, and then is injected into a continuous reactor through a catalyst nozzle or injection apparatus. In yet another embodiment, catalyst and the initiator are added to the reactor separately. In another embodiment, the initiator is blended with the feed monomers before injection to the reactor. Desirably, the monomer is not contacted with the catalyst, or the catalyst combined with the initiator before entering the reactor.

In another embodiment of the invention, the initiator and catalyst are allowed to pre-complex by mixing together in the selected diluent at temperatures between −40° C. and the freezing point temperature of the diluent, with a contact time between 0.01 seconds and several hours, and between 0.1 seconds and 5 minutes, preferably less than 3 minutes, preferably between 0.2 seconds and 1 minute before injection into the reactor.

In yet another embodiment of the invention, the initiator and catalyst are allowed to pre-complex by mixing together in the selected diluent at temperatures between −80° C. and 150° C., typically between −40° C. and the desired reaction temperature, typically between −40° C. and 120° C.

The overall residence time in the reactor can vary, depending upon, for example, catalyst activity and concentration, monomer concentration, feed injection rate, production rate, reaction temperature, and desired molecular weight. Residence time will generally be between about a few seconds and five hours, and typically between about 10 and 60 minutes. A variable influencing residence time is the monomer and diluent feed injection rates and the overall reactor volume.

According to another embodiment of the invention, the process can be carried out in a loop reactor or a stirred tank reactor. Withdrawal of polymer product from the reactor can be accomplished by concentrating the solids for intermittent withdrawal or by continuous withdrawal of a portion of the slurry. Intermittent withdrawal is typically driven by a difference between the density of the polymer product and the density of the diluent. In a particular embodiment, polymerization slurry is circulated within a loop reactor by multiple pumps. Typically in such an embodiment, the reactor volume is greater than 20,000 gallons (75.7 kiloliters).

The overall residence time in the reactor can vary, depending upon, for example, catalyst activity and concentration, monomer concentration, feed injection rate, production rate, reaction temperature, and desired molecular weight. Residence time will generally be between about a few seconds and five hours, and typically between about 10 and 60 minutes. A variable influencing residence time is the monomer and diluent feed injection rates and the overall reactor volume.

In one embodiment of the invention, the reactor is operated at a space time yield greater than 2.6 lbs/hr-gal (0.316 kg/hr-1). Alternatively, the reactor is operated at a space time yield greater than 3.0 lbs/hr-gal (0.360 kg/hr-1), alternatively greater than 3.3 lbs/hr-gal (0.395 kg/hr-1).

In another embodiment, polymerization slurry in the reactor has a volume percent solids greater than 50. Preferably, the volume percent solids in the polymerization slurry in the reactor is greater than 60, more preferably the volume percent solids in the polymerization slurry in the reactor is greater than 70. The volume percent solids in the reactor is measured by visually observing the solids level of a representative captive sample of the reaction mixture which was allowed to settle at saturation pressure in a sight glass. In this measurement method, the volume percent solids is determined by observing the height of the settled polymer particles in the sight glass and dividing this observed height by the height of the total captive sample of the reaction mixture, and wherein the cross sectional area of the sight glass containing the captive sample is the same as the cross sectional area of the vertical pipe of the pipe-loop reactor.

Product Recovery

Polymer product that leaves the reactor unit of the reaction system contains entrained material that should be separated from the polymer. Included in this polymer product are unreacted monomers and undesirable hydrocarbon by-products of the reaction process. Also included are any diluent and/or solvent materials that are not reactive to form desirable polymer, and are especially problematic with regard to removal and/or recovery.

A substantial portion (i.e., a majority) of the polymer product is separated from the non-polymer product by sending product effluent from the polymer reactor to a polymer recovery system. The polymer recovery system is operated by controlling a variety of parameters including temperature, pressure, vapor-liquid separation systems, and purge systems or vessels.

In one embodiment, the polymer recovery system incorporates the use of an inert gas to purge or scrub out undesirable entrained material from the polymer product. The inert gas is a composition that is substantially non-reactive with the polymer product, and can be used in sufficient quantity as a driving force to separate the non-polymer components from the polymer product. Examples of useful inert gases include air and nitrogen.

In a particular embodiment, polymer associated with entrained materials such as unreacted monomer, hydrocarbon by-product and diluent such as hydrofluorocarbon is recovered from a polymerization reaction process and sent to a polymer recovery system. Preferably, the polymer recovery system includes a purge system or vessel, more preferably a purge bin, and the polymer and associated entrained materials are sent to the purge system. The inert gas composition is then input into the purge system to purge or drive out the entrained materials, thereby forming a purge stream, which is recovered from the purge system.

Entrained, non-polymer product material that is separated and recovered as a purge stream from the polymer product is preferably further separated into component fractions or a plurality of streams and each fraction or stream stored, recycled or vented from the system as appropriate. It is preferred that diluent and unreacted monomer be separated and returned to the reactor. These streams can be separated and recovered as individual streams or as a combined stream. If in inert gas is used in the recovery system, it is preferred that the inert gas also be separated, preferably as an individual stream, and recovered for reuse in the polymer recovery system and/or in the reaction portion of the polymerization system.

In one embodiment, the effluent from the polymerization reactor is flashed in a first flash to vaporize from about 50% to about 100% of the liquid medium to produce concentrated polymer effluent and vaporized liquid. Flashing can be accomplished by reducing pressure or by heating. Preferably, the vapor obtained in the first flash is condensed, more preferably the vapor is condensed without compression, and most preferably is compressed by heat exchange. Preferably, the first flash is operated at from about 140 psia (965 kPa) to about 315 psia (2172 kPa).

In another embodiment, polymer solids are discharged from a first flash to a second flash through a seal chamber. The seal chamber preferably is of sufficient dimension such as to maintain a volume of polymer solids/slurry in the seal chamber sufficient to maintain a pressure seal.

In another embodiment, concentrated polymer effluent and vaporized liquid are continuously separated. In a preferred aspect, the concentrated polymer effluent slurry is flashed in a second flash to vaporize liquid.

In one embodiment of the invention, the polymerization effluent from the polymerization reactor is heated and then sent to a flash operation. Preferably, the polymerization effluent is heated to a temperature below the fusion temperature of the polymer. The quantity of heat supplied to the polymerization effluent is preferably at least equal to that quantity of heat which equals the heat of vaporization of the liquid medium which is to be flashed.

The polymer solids can be separated by any appropriate physical means as well. One non-limiting example is to separate the polymer solids from the diluent using a centrifuge apparatus.

Polymer Products

General Polymer Products

The polymers produced by the process of the invention can be used in a wide variety of products and end-use applications. The polymers produced by the process of the invention include linear low density polyethylene, elastomers, plastomers, high density polyethylenes, medium density polyethylenes, low density polyethylenes, multimodal or bimodal high molecular weight polyethylenes, polypropylene and polypropylene copolymers.

Density

The polymers produced according to this invention can be produced at any density suitable for the appropriate end use. In one embodiment, there can be produced ethylene based polymers having a density in the range of from 0.86 g/cc to 0.97 g/cc. For some applications, a density in the range of from 0.88 g/cc to 0.920 g/cc is preferred while in other applications, such as pipe, film and blow molding, a density in the range of from 0.930 g/cc to 0.965 g/cc is preferred. For low density polymers, such as for film applications, a density of 0.910 g/cc to 0.940 g/cc is preferred. Density is measured in accordance with ASTM method 1505.

Molecular Weight and Molecular Weight Distribution

The polymers produced by the process of the invention can be produced in a wide variety of molecular weights and molecular weight distributions. Molecular weights (weight average molecular weight (Mw) and number average molecular weight (Mn)) are preferably determined using a Waters 150 Size Exclusion Chromatograph (SEC) equipped with a differential refractive index detector (DRI), an online low angle light scattering (LALLS) detector and a viscometer (VIS). The details of the detector calibrations are described by T. Sun, P. Brant, R. R. Chance, and W. W. Graessley, *Macromolecules*, Volume 34, Number 19, 6812-6820, (2001), and are incorporated herein by reference.

The polymers produced by the process of the invention can be used in a wide variety of products and end-use applications. Preferred polymers produced herein may have an $M_n$ (number-average molecular weight) value from 300 to 1,000,000, or between from 700 to 300,000. For low weight molecular weight applications, such as those copolymers useful in lubricating and fuel oil compositions, an $M_n$ of 300 to 20,000 is contemplated, or less than or equal to 10,000.

In one embodiment, the polymer produced has a weight average molecular weight (Mw) of 40,000 or more, preferably 60,000 or more, preferably 100,000 or more, preferably 120,000 or more, preferably 150,000 or more. For LLDPE cast grade films a weight average molecular weight of 40,000 or more is preferred while a weight average molecular weight of 60,000 or more is preferred for blown film grades.

In an embodiment of the invention, the polymers produced have a molecular weight distribution (MWD), which is defined as a ratio of weight average molecular weight to number average molecular weight (MWD=$M_w/M_n$), of greater than 2.5 to about 70. In some embodiments, the polymer has a $M_w/M_n$ of from about 3 to 60, while in other embodiments the polymer produced has a $M_w/M_n$ of from about 3.5 to 40.

In another embodiment, the polyolefin produced has at least two species of molecular weights. Preferably, both species are present at greater than 20 weight %, based upon deconvolution of GPC molecular weight distribution curve.

Melt Index

The polymers produced by the process of the invention can be produced according to a desired or predetermined melt index, depending upon desired end use. In one embodiment, the polymers have a melt index (MI) or ($I_2$), as measured by ASTM-D-1238-E, in the range from 0.01 dg/min to 1000 dg/min, more preferably from about 0.01 dg/min to about 100 dg/min, even more preferably from about 0.01 dg/min to about 50 dg/min, and most preferably from about 0.1 dg/min to about 10 dg/min.

In another embodiment of the invention, the polymers have a melt index ratio ($I_{21}/I_2$) ($I_{21}$ is measured by ASTM-D-1238-F) of from 10 to less than 25, more preferably from about 15 to less than 25.

The polymers of the invention in a preferred embodiment have a melt index ratio of from preferably greater than 25, more preferably greater than 30, even more preferably greater that 40, still even more preferably greater than 50 and most preferably greater than 65. In another embodiment, the polymer of the invention has a narrow molecular weight distribution and a broad composition distribution or vice-versa,. Examples include those polymers described in U.S. Pat. No. 5,798,427, the description of which is incorporated herein by reference.

These polymer products are also characterized as having at least 10 ppm of residual fluorine present, preferably between 10 and 10,000 ppm of fluorine present, preferably between 10 and 1000 ppm.

Applications

Polymers produced by the process of the invention and blends thereof are useful in producing any variety of articles. For example, the polymers are useful in such forming operations as film, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers include melt spinning, solution spinning and melt blown fiber operations for use in woven or non-woven form to make filters, diaper fabrics, medical garments, geotextiles, etc. Extruded articles include medical tubing, wire and cable coatings, pipe, geomembranes, and pond liners. Molded articles include single and multi-layered constructions in the form of bottles, tanks, large hollow articles, rigid food containers and toys, etc.

Test Methods

The melt index (MI) was measured in accordance with ASTM D 1238 (190° C., 2.16 kg), the melt index ratio (MIR) was determined from the ratio of the MI measurements at (190° C., 21.6 kg) to that at (190° C., 2.16 kg). Measurements were started after about 6½ minutes.

Density

Density in g/cc is determined in accordance with ASTM 1505 and ASTM D-1928, procedure C, plaque preparation. A plaque is made and conditioned for one hour at 100° C. to approach equilibrium crystallinity, measurement for density is then made in a density gradient column.

Mw and Mn were measured by two GPC (Gel Permeation Chromotography) methods:

GPC Method "A"—High Temperature Gel Permeation Chromatography

This method uses a Waters 150C ALC/GPC gel permeation chromatograph equipped with a Waters differential refractometer that measures the difference between the refractive index of the solvent and that of the solvent containing the fractionated polymer. The system was used at 145° C. with 1,2,4-trichlorobenzene (TCB) as the mobile phase that is stabilized with ~300 ppm of Santonox. The flow rate used was 1 mL/min. Three Shodex (Showa Denko America, Inc) mixed bed columns AT_80M/S were used. The data is acquired and analyzed using Waters Corporation Millenium version 2.15.01 (or equivalent) software.

Polyethylene (PE) molecular weight values are calculated based on a 3 Region "broad calibration" approach: 1) The low molecular weight region (250-850 g/mole) is calibrated by a series of n-alkanes. 2) The column calibration in the middle molecular weight region (5,000-350,000 g/mole) is based on narrow polystyrene standards for which polyethylene 'equivalent' peak molecular weights have been assigned using NBS 1475, a linear PE standard from the National Institute of Standards and Testing (NIST) according to the procedure discussed in "*National Bureau of Standards Journal of Research, Section A. Physics and Chemistry*, Vol. 76A, No. 2, March-April 1972, pg 140", which is incorporate herein by reference. 3) Polystyrene standards are used to calibrate for MW>350,000 using the "universal calibration" method and the following Mark-Houwink coefficients:

|     | k (dL/g)        | a    |
| --- | --------------- | ---- |
| PS  | $1.75 \times 10^{-4}$ | 0.67 |
| PE  | $5.17 \times 10^{-4}$ | 0.70 |

A calibration curve (log Mp vs. retention volume) is generated by recording the retention volume at the peak in the DRI signal for each standard. The calibrations in each region are combined to form a single calibration curve of Log(MP) vs retention volume. A third order fit is used to fit the data, and an extrapolation point is determined to extend the calibration curve.

GPC Method "B"—Gel Permeation Chromatography—DRI Only

This method uses a Waters 150C C GPC gel permeation chromatograph equipped with a Waters differential refractometer that measures the difference between the refractive index of the solvent and that of the solvent containing the fractionated polymer. The system was used at 145° C. with 1,2,4-Trichlorobenzene (TCB) as the mobile phase that was stabilized with ~250 ppm of butylated hydroxy toluene (BHT). The flow rate used was 0.5 mL/min. Three (Polymer Laboratories) PLgel Mixed-B columns were used. This technique is discussed in "*Macromolecules*, Vol. 34, No. 19, pp. 6812-6820" which is incorporated herein by reference.

The separation efficiency of the column set was calibrated using a series of narrow MWD polystyrene standards, which reflects the expected MW range for samples and the exclusion limits of the column set. At least 10 individual polystyrene standards, ranging from Mp ~580 to 10,000,000, were used to generate the calibration curve. The polystyrene standards are obtained from Polymer Laboratories (Amherst, Mass.) or an equivalent source. To assure internal consistency, the flow rate is corrected for each calibrant run to give a common peak position for the flow rate marker (taken to be the positive inject peak) before determining the retention volume for each polystyrene standard. The flow marker peak position thus assigned was also used to correct the flow rate when analyzing samples; therefore, it is an essential part of the calibration procedure. A calibration curve (log Mp vs. retention volume) is generated by recording the retention volume at the peak in the DRI signal for each PS standard, and fitting this data set to a 2nd-order polynomial. Polystyrene standards were graphed using Viscotec 3.0 software. Samples were analyzed using WaveMetrics, Inc. IGOR Pro and Viscotec 3.0 software using updated calibration constants.

A preferred procedure used in the present application for Differential Scanning Calorimetry (DSC) is described as follows. Peak melting point (Tm), peak crystallization temperature (Tc), heat of fusion and crystallinity were determined using the following procedure according to ASTM E 794-85. Differential scanning calorimetric (DSC) data was obtained using a TA Instruments model 2920 machine. Samples weighing approximately 7-10 mg were sealed in aluminum sample pans. The DSC data was recorded by first cooling the sample to −50° C. and then gradually heating it to 200° C. at a rate of 10° C./minute, called first melt. The sample was kept at about 200° C. for 5 minutes before a second cooling-heating cycle was applied. During the second cycle, the sample was cooled from 200° C. to −50° C. at a rate of 10° C./minute, called second cool, and then kept at −50° C. for 5 minutes and heated to 200° C. at a rate of 10° C./minute, called second melt. All the thermal events in both the first and second cycle were recorded. The melting temperature ($T_m$) was the peak temperature of the melting curve and the crystallization temperature ($T_c$) was the peak temperature of the cooling peak. Tm, Tc and heat of fusion were obtained from the thermal events in the second melt and second cool unless otherwise noted.

Crystallinity: Weight percent degree of crystallinity is calculated from the measured density of the sample and known densities of crystalline and amorphous polyethylene according to the equation: $100 \times (1/\rho - 1/\rho_a)/(1/\rho_c - 1/\rho_a)$, as described in the *Handbook of Polyethylene*, published by Marcel Dekker, Inc. In this calculation, $\rho$ is the measured sample density, $\rho_c$ is the unit cell crystalline density, and $\rho_a$ is the amorphous density. The value of $\rho_c$ is taken to be 1.000 g/cm$^3$, while the value of $\rho_a$ is commonly accepted as 0.853 g/cm$^3$.

EXAMPLES

Experimental—Polymerizations (Tables 1-7):

The following experimental examples demonstrate that the slurry phase polymerization of ethylene with supported Ziegler-Natta catalysts is enabled with diluents consisting of varying levels of heteroatom (i.e. not pertaining to C or H) incorporation. These diluents can possess a range of boiling points depending on their composition and molecular weight.

For the examples below, the heteroatomic nature of the diluent is defined as:

atoms per molecule excluding C and H/total # of atoms.

Thus, for a conventional hydrocarbon diluent, this value is equal to zero.

Table 1 Below Lists Examples of Conventional and Heteroatom Containing Diluents

| Diluent | Heteroatomic Nature | Boiling Point (C.) |
|---|---|---|
| n-hexane | 0.0 | 69 |
| Isobutane | 0.0 | −12 |
| Perfluorohexane | 0.7 | 59 |
| Perfluorobutane | 0.7 | −2 |
| Perfluorocyclobutane | 0.7 | −5.8 |
| 1,1,1,2,3,3,3 heptafluoropropane (HFC-227ea) | 0.64 | −15.2 |
| 1,1,1,3,3,3 hexafluoropropane (HFC-236fa) | 0.55 | −1 |
| 1,1,1,2,3,3 hexafluoropropane (HFC-236ea) | 0.55 | 6.5 |
| 1,1,1,3,3 hexafluoropropane (HFC-245fa) | 0.45 | 15 |
| 2-Fluoropropane (HFC-281) | 0.09 | −2.5 |

In the following slurry phase experiments pressure is reported in atmospheres and pounds per square inch. The conversion factors to S.I. Units are; 1 psi equals 6.894757 kPa and 1 atm equals 101.325 kPa.

Feed and Co-Monomer

Polymerization grade ethylene was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

A mixture of 19.99 mol % $N_2$ and balance $H_2$ was obtained from Aeriform. It was further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

98+% 1-hexene was obtained from Alfa-Aesar and further purified by filtration through basic alumina (Aldrich Chemical Company, Brockman Basic 1) into a vessel containing activated 3A molecular sieve.

Catalysts

A supported Ziegler/Natta catalyst, prepared according to U.S. Pat. No. 4,302,566, was obtained from ExxonMobil Chemical Company. This catalyst is prepared in three steps. In the first step, W.R. Grace & Co. 955 silica dehydrated at 600° C. is reacted with AlEt$_3$ at 60° C. in isopentane, solvent is removed and the resulting product is dried. In the second step, a solution of MgCl$_2$ and TiCl$_3$·⅓AlCl$_3$ dissolved in THF is mixed at 60° C. with the product formed in the first step, solvent is removed and the resulting product is dried. In the third step, the product formed in the second step is reacted with Et$_2$AlCl and Al(n-hexyl)$_3$ at 60° C. in isopentane, the solvent is removed and the product is dried.

Scavengers/Co-Catalysts

Triethyl aluminum (TEAL) was obtained from Akzo Chemicals, Inc. and used without further purification.

Diluents 1,1,1,3,3,3 hexafluoropropane (HFC-236fa) was obtained from DuPont. 1,1,1,2,3,3 hexafluoropropane (HFC-236ea), 2H-heptafluoropropane (HFC-227ea), and perfluorobutane, were obtained from SynQuest Laboratories, Inc. Polymerization grade isobutane was also used.

All above diluents were purified by passing through a series of purification materials in the order of Molecular Sieve 3A (obtained from Aldrich Chemical Company), Molecular Sieve 13X (obtained from Aldrich Chemical Company), and Selexsorb CD (obtained from Aldrich Chemical Company) prior to being used as a polymerization medium.

Polymerization grade hexane was used and further purified by passing it through a series of columns: 500 cc Oxyclear cylinder from Labclear (Oakland, Calif.) followed by a 500 cc column packed with dried 3 Å mole sieves purchased from Aldrich Chemical Company, and a 500 cc column packed with dried 5 Å mole sieves purchased from Aldrich Chemical Company.

Reactor Description and Preparation

Polymerizations were conducted in an inert atmosphere ($N_2$) drybox using autoclaves equipped with an external heater for temperature control, glass inserts (internal volume of reactor=22.5 mL), septum inlets, regulated supply of nitrogen, hydrogen/nitrogen mixture, and ethylene, and equipped with disposable PEEK mechanical stirrers (400 RPM). The autoclaves were prepared by purging with dry nitrogen at 110° C. or 115° C. for 5 hours and then at 25° C. for 5 hours.

Ethylene/1-Hexene Copolymerization:

The reactor was prepared as described above, and then purged with ethylene. The reactors were heated to 40° C. and ethylene was first charged to the reactor.

Diluents with boiling points below room temperature were pressurized to approximately 80 psig (552 kPag) at ambient temperature to maintain them in the liquid phase and were subsequently added to the reactor via syringe. Higher boiling point diluents were added at ambient temperature and pressure via syringe. The amount of each diluent added at 40° C. was calculated to give approximately the same volumetric amount for all diluents (~4 mL) at the polymerization temperature to be studied. Therefore, an amount in excess of 4 mL was added to compensate for evaporative losses due to vapor pressure generation in the headspace above the diluent.

A solution of 1-hexene and TEAl scavenger/co-catalyst at room temperature and pressure was next added to the reactors via syringe. The reactors were then brought to process temperature (85° C.) while stirring at 400 RPM. Once at process temperature, ethylene delivery pressure for polymerization was set to the pressure generated by the components (ethylene, hydrogen, diluent, co-monomer, scavenger/co-catalyst) in the reactor. Reaction pressures for each test are included in Tables 2 and 5.

Supported catalyst was stirred in toluene at ambient temperature and pressure and added to the reactors (at process temperature and pressure) via syringe as a slurry to initiate polymerization. Amounts of all reagents, diluents, catalysts and co-catalysts are given in Tables 1 and 3.

In the nature that solutions are added via syringe, a hexanes solution is also injected via the same syringe following their addition to insure that minimal solution is remaining in the syringe. This procedure is applied after the addition of the 1-hexene/scavenger/co-catalyst solution as well as the catalyst slurry. Thus, in each case, the diluent mixture at reaction temperature consists of approximately 15-20 volume percent hexane as well.

Ethylene was allowed to enter (through the use of computer controlled solenoid valves) the autoclaves during polymerization to maintain reactor gauge pressure (+/−2 psig (13.8 kPag)). Reactor temperature was monitored and typically maintained within +/−1° C. Polymerizations were halted by addition of approximately 400 psig (2758 kPa) $O_2$/Ar (5 mole % $O_2$) gas mixture to the autoclaves for approximately 30 seconds. The polymerizations were quenched after a predetermined cumulative amount of ethylene had been added or for a maximum of 45 minutes polymerization time. The final quench time for each run is listed in Table The reactors were cooled and vented. The polymer was isolated after the remaining reaction components were removed in-vacuo. Yields reported include total weight of polymer and residual catalyst. Catalyst productivity is reported as grams of polymer per gram of catalyst per hour of reaction time (g/g·hr). Yields and catalyst productivity are listed in Tables 3 and 6 for all experiments at each condition.

Three sets of tests are included below. Tables 2-4 show the conditions and results of polymerizing ethylene and optionally comonomers in the slurry phase in a variety of diluents. Each diluent enables the polymerization of ethylene in the slurry phase on the supported Ziegler-Natta catalyst. Tables 5-7 illustrate the slurry phase polymerization of ethylene and optionally comonomers on a supported Ziegler-Natta catalyst in diluent mixtures of n-hexane and HFC-236fa.

TABLE 3

Reaction Conditions for examples A-F

| Example | Temperature (° C.) | Total Pressure (psig/kPag) | H2 Pressure (psig/kPag) |
|---|---|---|---|
| A | 85 | 150/1034 | 20/138 |
| B | 85 | 290/1999 | 20/138 |
| C | 85 | 375/2586 | 20/138 |
| D | 85 | 300/2068 | 20/138 |
| E | 85 | 260/1793 | 20/138 |
| F | 85 | 305/2103 | 20/138 |

TABLE 4

Results of polymerization for examples A-F

| Example | Experiment # | Yield (g) | Polymerization time (s) | Productivity (g/g h) |
|---|---|---|---|---|
| A | 1 | 0.145 | 2370.58 | 2201.9 |
|   | 2 | 0.1407 | 2320.73 | 2182.5 |
|   | 3 | 0.1409 | 2050.93 | 2473.2 |
|   | 4 | 0.1428 | 1807.84 | 2843.6 |
| B | 1 | 0.137 | 2459.66 | 2005.1 |
|   | 2 | 0.1469 | 2700.75 | 1958.1 |
|   | 3 | 0.1453 | 2585.45 | 2023.1 |
|   | 4 | 0.1457 | 2576.01 | 2036.1 |
| C | 1 | 0.054 | 1207.98 | 1609.2 |
|   | 2 | 0.087 | 1843.19 | 1699.2 |
|   | 3 | 0.0866 | 1839.12 | 1695.1 |
|   | 4 | 0.0722 | 1097.17 | 2369.0 |
| D | 1 | 0.1058 | 2701.48 | 1409.9 |
|   | 2 | 0.0858 | 2700.74 | 1143.7 |
|   | 3 | 0.061 | 2701.3 | 812.9 |
|   | 4 | 0.0691 | 2387.88 | 1041.7 |
| E | 1 | 0.0873 | 2666.02 | 1178.8 |
|   | 2 | 0.079 | 2700.53 | 1053.1 |
|   | 3 | 0.0856 | 1947.35 | 1582.4 |
| F | 1 | 0.0638 | 2702.08 | 850.0 |
|   | 2 | 0.0562 | 2700.87 | 749.0 |
|   | 3 | 0.068 | 2701.98 | 906.0 |
|   | 4 | 0.0696 | 2702.17 | 927.2 |

The results illustrate that productivity for ethylene polymerization on supported Ziegler-Natta catalysts is enabled for a slurry process in a variety of diluents with heteroatomic character in addition to the conventional diluents of hexane and isobutane.

TABLE 2

Amounts charged to reactors for varying diluents

| Example | Diluent | Amt (mL) | C6 = (µL) | TEAL (µmol) | Catalyst (µg) |
|---|---|---|---|---|---|
| A | n-Hexane | 4.0 | 300 | 3 | 100 |
| B | Isobutane | 4.8 | 300 | 3 | 100 |
| C | 1,1,1,2,3,3 heptafluoropropane (HFC-227ea) | 5.45 | 300 | 10 | 100 |
| D | 1,1,1,3,3,3 hexafluoropropane (HFC-236fa) | 4.75 | 300 | 3 | 100 |
| E | 1,1,1,2,3,3 hexafluoropropane (HFC-236ea) | 4.53 | 300 | 10 | 100 |
| F | Perfluorobutane | 5.05 | 300 | 20 | 100 |

TABLE 5

Amounts charged to reactors for diluent mixtures of n-hexane and HFC-236fa

| Example | n-hexane vol % | Amt (mL) | HFC-236fa vol % | Amt (mL) | C6= ($\mu$L) | TEAl ($\mu$mol) | Catalyst ($\mu$g) |
|---|---|---|---|---|---|---|---|
| G | 100 | 4.2 | 0 | 0 | 700 | 3 | 100 |
| H | 80 | 3.3 | 20 | 1.3 | 700 | 3 | 100 |
| I | 70 | 2.8 | 30 | 1.9 | 700 | 3 | 100 |
| J | 60 | 2.3 | 40 | 2.6 | 700 | 3 | 100 |
| K | 40 | 1.3 | 60 | 3.8 | 700 | 3 | 100 |
| L | 15 | 0.1 | 85 | 5.8 | 700 | 3 | 100 |

TABLE 6

Reaction Conditions for examples G-L

| Example | Temperature (° C.) | Total Pressure (psig/kPag) | H2 Pressure (psig/kPag) |
|---|---|---|---|
| G | 85 | 140/965 | 20/138 |
| H | 85 | 210/1448 | 20/138 |
| I | 85 | 210/1448 | 20/138 |
| J | 85 | 229/1579 | 20/138 |
| K | 85 | 237/1634 | 20/138 |
| L | 85 | 260/1793 | 20/138 |

TABLE 7

Results for examples G-L

| Example | Experiment # | Yield (g) | Polymerization time (s) | Productivity (g/g h) |
|---|---|---|---|---|
| G | 1 | 0.0841 | 843.99 | 3574.7 |
|   | 2 | 0.0777 | 1025 | 2719.5 |
|   | 3 | 0.076 | 903.11 | 3018.9 |
|   | 4 | 0.0744 | 938.66 | 2843.4 |
|   | 5 | 0.0735 | 963.27 | 2737.3 |
|   | 6 | 0.0724 | 1080.3 | 2404.3 |
| H | 1 | 0.0812 | 774.49 | 3774.3 |
|   | 2 | 0.0803 | 946.1 | 3055.5 |
|   | 3 | 0.0827 | 876.53 | 3396.5 |
|   | 4 | 0.0841 | 890.93 | 3398.2 |
|   | 5 | 0.0788 | 819.33 | 3462.3 |
|   | 6 | 0.0814 | 900.12 | 3255.5 |
| I | 1 | 0.0869 | 926.48 | 3364.8 |
|   | 2 | 0.0795 | 954.06 | 2989.3 |
|   | 3 | 0.083 | 884.94 | 3364.7 |
|   | 4 | 0.0836 | 865.14 | 3466.6 |
|   | 5 | 0.0759 | 1028.8 | 2646.5 |
|   | 6 | 0.0808 | 889.59 | 3258.4 |
| J | 1 | 0.1052 | 1630.6 | 2322.5 |
|   | 2 | 0.1017 | 1658.5 | 2207.5 |
|   | 3 | 0.0971 | 1270.3 | 2751.8 |
|   | 4 | 0.095 | 1454 | 2352.1 |
|   | 5 | 0.0951 | 1639.2 | 2088.5 |
|   | 6 | 0.0875 | 1134.3 | 2777.0 |
| K | 1 | 0.0921 | 1849.3 | 1786.6 |
|   | 2 | 0.0892 | 1944 | 1646.1 |
|   | 3 | 0.0896 | 1397.1 | 2300.6 |
|   | 4 | 0.0708 | 1377.6 | 1843.7 |
|   | 5 | 0.0899 | 1624 | 1985.9 |
|   | 6 | 0.0818 | 1677.9 | 1748.9 |
| L | 1 | 0.0797 | 2700.8 | 1062.3 |
|   | 2 | 0.0697 | 2700.4 | 929.2 |
|   | 3 | 0.0657 | 2701.1 | 875.6 |
|   | 4 | 0.0873 | 2700.1 | 1164.0 |
|   | 5 | 0.0506 | 2700.5 | 674.5 |
|   | 6 | 0.074 | 2700.5 | 986.5 |

The results illustrate that productivity for ethylene and optionally comonomers polymerization on supported Ziegler-Natta catalysts is enabled for a slurry process in a diluent mixture consisting of n-hexane and a second diluent with heteroatomic character, HFC-236fa. Moreover, productivity is shown to be approximately constant until approximately 40% of the n-hexane is displaced by HFC-236fa.

The above data show that blends with minor quantities of HFC diluents can sustain polymerization without loss in productivity.

Experimental—Polymerizations (Table 8):

Starting Materials

Catalyst: A supported Ziegler/Natta catalyst, prepared according to U.S. Pat. No. 4,302,566, was obtained from ExxonMobil Chemical Company. This catalyst is prepared in three steps. In the first step, W.R. Grace & Co. 955 silica dehydrated at 600° C. is reacted with AlEt$_3$ at 60° C. in isopentane, solvent is removed and the resulting product is dried. In the second step, a solution of MgCl$_2$ and TiCl$_3$.⅓AlCl$_3$ dissolved in THF is mixed at 60° C. with the product formed in the first step, solvent is removed and the resulting product is dried. In the third step, the product formed in the second step is reacted with Et$_2$AlCl and Al(n-hexyl)$_3$ at 60° C. in isopentane, the solvent is removed and the product is dried.

1-hexene: The 1-hexene comonomer was obtained from Alfa Aesar, their stock number 31648, and was purified prior to use by passing it through a column of activated aluminum oxide, obtained from Aldrich Chemical Company (their part Number 19,944-3). Before use, the activated aluminum oxide was placed in a vacuum oven at 200° C., and vacuum was applied at least over night.

1-Butene: The 1-butene was obtained from Matheson Tri-State and was purified prior to use by passing it through a series of purification columns before it was introduced into the reactor. The columns were (sequentially): 4A molecular sieves, Selexsorb CD alumina, Selexsorb COS alumina, and Oxyclear column. The 4A mole sieves were 8-12 mesh and were obtained from Aldrich Chemical Company (their part number 20,860-4). The Selexsorb CD alumina (7×14 mesh, no part number) and Selexsorb COS (7×14 mesh, no part number) were manufactured by Alcoa Chemical company. The Oxyclear column was obtained from Lab Clear, 508 29th Avenue, Oakland Calif. 94601, part number RGP-R1-1000.

Triethylaluminum (TEAL): The TEAL was obtained as a 1M solution in hexane from Aldrich Chemical Company (their part number 25,266-2) and was diluted with hexane to 0.5M before use.

Hexane: The hexane used to dilute the TEAL was obtained from Aldrich Chemical Company (their part number 29,609-0). It was used as received.

Isobutane: The isobutane was passed through a series of purification columns on the way to the reactor. The columns were (sequentially): 13X molecular sieves, Selexsorb CD alumina, Selexsorb COS alumina, and Oxyclear column. The 13X mole sieves were 8-12 mesh and were obtained from Aldrich Chemical Company (their part number 20,864-7). The Selexsorb CD alumina (7×14 mesh, no part number) and Selexsorb COS (7×14 mesh, no part number) were manufactured by Alcoa Chemical company. The Oxyclear column was obtained from Lab Clear, 508 29th Avenue, Oakland Calif. 94601, part number RGP-R1-1000.

Ethylene: The ethylene was a polymerization grade and was passed through a series of purification columns on the way to the reactor. The columns were (sequentially): 3A molecular sieves, Selexsorb CD alumina, Selexsorb COS alumina, and Oxyclear column. The 3A mole sieves were 8-12 mesh and were obtained from Aldrich Chemical Company (their part number 20,858-2). The Selexsorb CD alumina (7×14 mesh, no part number) and Selexsorb COS (7×14 mesh, no part number) were manufactured by Alcoa Chemical company. The Oxyclear column was obtained from Lab Clear, 508 29th Avenue, Oakland Calif. 94601, part number RGP-R1-1000.

HFC-236fa: (1,1,2,3,3,3,-hexafluoropropane) The HFC-236fa was obtained from DuPont, marketed as SUVA 236fa. The HFC-236fa was passed through purification columns containing 3A mole sieves, 13X mole sieves, and Selexsorb CD alumina. The 13X mole sieves were 8-12 mesh and were obtained from Aldrich Chemical Company (their part number 20,864-7). The other packing materials were the same as those for the ethylene purification (described above).

HFC-245fa: (1,1,1,3,3-pentafluoropropane) The HFC-245fa was obtained from Honeywell, as marketed under their trade name Enovate 3000. The HFC-236fa was passed through purification columns containing 3A mole sieves, 13X mole sieves, and Selexsorb CD alumina, and Oxyclear. The 13X mole sieves were 8-12 mesh and were obtained from Aldrich Chemical Company (their part number 20,864-7). The other packing materials were the same as those for the ethylene purification (described above).

Hydrogen: The hydrogen was Ultra High Purity Grade obtained from Matheson Tri-Gas. It was passed through an OxyClear Column before used.

EXAMPLES

Experimental runs were conducted in a lab-scale, 2-liter slurry polymerization reactor using the described diluent in Tables 1 and 8. The catalyst was used as described above. The cocatalyst was triethylaluminum (TEAL). Ethylene, butene and 1-hexene were used as comomoners. All experiments were carried out at a reaction temperature of 85° C., for 45 minutes. The 1-hexene, 1-butene and diluent were purified prior to reaction by passing the purification systems as described above.

For each experiment, the reactor was purged with nitrogen, followed by the addition of the Teal solution (0.5 molar in hexane), 60 to 350 cc of 1-hexene or 60 cc of butene-1 and 60-90 mmoles of hydrogen. Then 750 cc of diluent was added. The reactor temperature was raised to 85° C., and ethylene gas was added to raise the system pressure to 300 psig (2068 kPag). Then the catalyst was then flushed in with 250 ml of additional diluent to initiate reaction.

During the reaction, the system temperature was maintained at 85° C. by means of an external steam and cooling water control system, and the pressure was maintained at 300 psig (2068 kPag) by means of an ethylene make-up system. (As the ethylene was consumed by reaction, additional ethylene was added to the system automatically to hold the reactor pressure at 300 psig (2068 kPag).) The reaction was maintained for 45 minutes, at which time the reactor was vented to terminate the reaction. The reactor was then opened, and the polymer product collected for analysis. Depending on the experiment, the polymer product consisted of granular resin and/or foulant material. The granular material was poured from the reactor, and the foulant material was scraped off of the reactor walls and slurry agitator. The granular material and foulant were individually weighed and analyzed for weight percent fouling, productivity (PD), density, melt index ($MI_2$ and $MI_{21}$), melt flow ratio (MFR=$MI_{21}/MI_2$), and polydispersity index (PDI=weight average molecular weight divided by number average molecular weight). Results are given in Table 8.

TABLE 8

| Ex. # | Diluent | Hexene (cc) | Catalyst (mg) | TEAL (mmol) | H2 (mmol) | Run Time (min) | Wt. % Fouling | Prod. (g/g/hr.) | Density (g/cc, ASTM) | MI2 (dg/min.) |
|---|---|---|---|---|---|---|---|---|---|---|
| 1 | Isobutane | 150 | 105 | 1.0 | 90 | 45 | 3.1 | 1187 | 0.9310 | 6.09 |
| 2 | Isobutane | 250 | 110 | 1.0 | 90 | 45 | 6.2 | 1622 | 0.9279 | 5.01 |
| 3 | Isobutane | 350 | 104 | 1.0 | 90 | 45 | 54.4 | 1800 | 0.9211 | 6.77 |
| 4 | HFC 236fa | 350 | 105 | 1.0 | 90 | 45 | 100.0 | 975 | 0.883 | 107.1* |
| 5 | HFC 236fa | 150 | 107 | 1.0 | 90 | 45 | 0.4 | 1206 | 0.9138 | 16.79 |
| 6 | HFC 236fa | 100 | 101 | 1.0 | 90 | 45 | 0.0 | 1340 | 0.9208 | 5.38 |
| 7 | HFC 236fa | 250 | 105 | 1.0 | 90 | 45 | 100.0 | 629 | 0.8857 | 205.60 |
| 8 | HFC 236fa | 60 | 105 | 1.0 | 90 | 45 | 0.0 | 598 | 0.9286 | 11.27 |
| 9 | Isobutane | 100 | 104 | 1.0 | 90 | 45 | 0.1 | 1460 | 0.9357 | 2.12 |
| 10 | Isobutane | 60 | 103 | 1.0 | 90 | 45 | 0.0 | 1186 | 0.9412 | 1.45 |
| 11 | Isobutane | 150 | 102 | 1.0 | 90 | 45 | 0.0 | 1737 | 0.9296 | 0.35 |
| 12 | HFC 245fa | 150 | 100 | 1.0 | 90 | 45 | 0.0 | 1855 | 0.9243 | 5.36 |
| 13 | HFC 245fa | 200 | 102 | 1.0 | 90 | 45 | 0.0 | 1765 | 0.9161 | 17.43 |
| 14 | HFC 245fa | 235 | 98 | 1.0 | 90 | 45 | 0.0 | 2272 | 0.9160 | 10.65 |
| 15 | HFC 245fa | 300 | 100 | 1.0 | 90 | 45 | 0.0 | 2559 | 0.9151 | 9.30 |
| 16 | HFC 245fa | 400 | 99 | 1.0 | 90 | 45 | 4.0 | 2298 | 0.8968 | 38.45 |
| 17 | HFC 245fa | 355 | 101 | 1.0 | 90 | 30 | 0.0 | 5365 | 0.9169 | 0.58 |
| 18 | HFC 245fa | 330 | 101 | 1.0 | 90 | 45 | 0.0 | 2164 | 0.9086 | 30.06 |
| 19 | HFC 245fa | 375 | 101 | 1.0 | 90 | 45 | 0.0 | 3504 | 0.9144 | 2.78 |
| 20 | HFC 245fa | 350 | 103 | 1.0 | 90 | 45 | 0.0 | 2188 | 0.9067 | 25.26 |
| 21 | 50/50 IC4/245 | 150 | 102 | 1.0 | 90 | 45 | 2.3 | 1011 | 0.9156 | 18.26 |
| 22 | Isobutane | 60$^C$ | 100 | 1.0 | 60 | 45 | 0.0 | 820 | 0.9301 | 5.51 |
| 23 | HFC 236fa | 60$^C$ | 104 | 1.0 | 60 | 45 | 0.0 | 444 | 0.9276 | 8.84 |
| 24 | HFC 245fa | 60$^C$ | 97 | 1.0 | 60 | 45 | 0.0 | 1783 | 0.9304 | 2.73 |

TABLE 8-continued

| Ex. # | MI21 (dg/min.) | MFR (MI21/MI2) | MWD (PDI) | Comments |
|---|---|---|---|---|
| 1 | 162.00 | 26.6 | 3.4$^A$ | |
| 2 | 130.80 | 26.1 | 3.51$^A$ | |
| 3 | 208.70 | 30.8 | 3.51$^A$ | |
| 4 | >2000 | | 5.09$^A$ | |
| 5 | 570.5* | 34.0 | 4.49$^A$ | |
| 6 | 194.8* | 36.2 | 4.8$^A$ | |
| 7 | >2000 | | 6.14$^A$ | |
| 8 | 377.3* | 33.5 | 4.7$^A$ | |
| 9 | 70.54* | 33.3 | 3.63$^A$ | |
| 10 | 52.94* | 36.5 | 3.99$^A$ | |
| 11 | 7.51 | 21.5 | 4.91$^B$ | |
| 12 | 164.30 | 30.7 | 5.35$^B$ | |
| 13 | 562.00 | 32.2 | 6.27$^B$ | Very, Very Slightly sticky, almost couldn't feel |
| 14 | 360* | 33.8 | 6.35$^B$ | No Stickiness |
| 15 | 288.7* | 31.0 | 5.03$^B$ | Reactor was clean. |
| 16 | 1304* | 33.9 | 7.22$^B$ | Fouling on the walls Foulant density = 0.9007, Polymer product was very sticky |
| 17 | 17.44 | 30.1 | 5.24$^B$ | Stopped run after 30 min, reactor was clean |
| 18 | 1126* | 37.5 | 5.35$^B$ | Slightly sticky |
| 19 | 89.77 | 32.3 | 5.15$^B$ | Slightly sticky |
| 20 | 910.4* | 36.0 | 5.97$^B$ | Slightly sticky |
| 21 | 609* | 33.4 | 4.86$^B$ | Slightly sticky |
| 22 | 141.60 | 25.7 | 4.65$^B$ | |
| 23 | 252.70 | 28.6 | 6.89$^B$ | |
| 24 | 84.72 | 31.0 | 4.98$^B$ | |

Reaction temperature 85 deg. C. for all samples; * ½ diameter, ½ height die; AGPC Method A; BGPC Method B; C-Butene Comonomer instead of Hexene.

The data in Table 8 shows that for the same amount of comonomer input to the process, the fluorinated hydrocarbon diluents show a higher incorporation of comonomer and a lower product density. This is most probably related to the lower ethylene solubility in HFC and thus a higher effective hexene-1 to ethylene ratio. This is shown graphically in FIG. 1.

Figure 2:
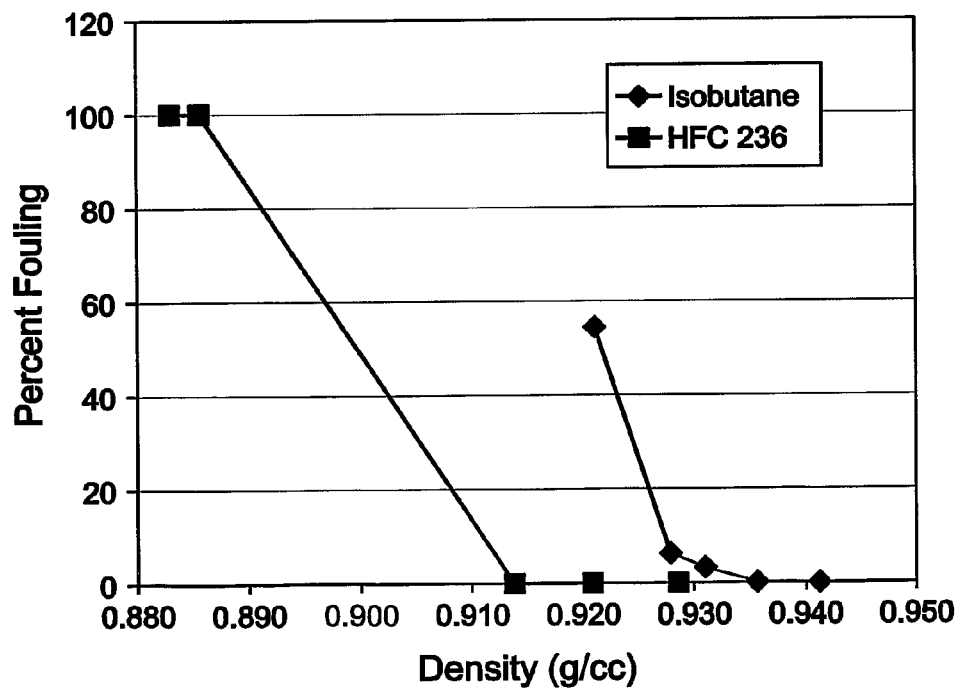
FIG. 2 shows the polymer density versus fouling for HFC vs. hydrocarbon diluent.

The data further show that product can be produced at a lower density using the fluorinated hydrocarbon diluents without fouling. This is shown graphically in FIG. 2.

Experimental—Polymerizations (Table 9):

$CF_3CH_2CF_2H$ was used as a diluent in a 2 L slurry reactor for ethylene 1-butene (co)polymerization. The catalyst used was Mitsui RZ type catalyst—a titanium-based supported Ziegler-Natta catalyst. Table 9 summarizes polymerization results from both HFC-245fa and hexane diluents and PE characterization data.

TABLE 9

Polymerization and PE Characterization Data

| Ex. No. | Diluent | T °C. | 1-Butene mL | H$_2$ mmol | Activity g/g/hr | I$_2$ dg/min | I$_{21}$ dg/min | I$_{21}$/I$_2$ | Density d/mL | Mn, g/mole | Mw, g/mole | Mw/Mn |
|---|---|---|---|---|---|---|---|---|---|---|---|---|
| 25 | HFC-245fa | 85 | 0 | 150 | 1500 | 29.55 | 1481 | 50.1 | >0.9650 | — | — | — |
| 26 | HFC-245fa | 85 | 0 | 300 | 1399 | 1316 | — | — | 0.9644 | — | — | — |
| 27 | HFC-245fa | 75 | 0 | 5 | 2047 | — | 0.319 | — | 0.9471 | — | — | — |
| 28 | HFC-245fa | 85 | 20 | 5 | 6920 | 0.472 | 28.29 | 59.9 | 0.9257 | — | — | — |
| 29 | HFC-245fa | 85 | 20 | 75 | 7390 | 173.5 | — | — | 0.9262 | — | — | — |
| 30* | HFC-245fa | 85 75 | 0 0 | 150 5 | 2367 | — | 6.29 | — | 0.9588 | 7861 | 329678 | 41.94 |
| 31* | HFC-245fa | 85 85 | 0 20 | 300 5 | 2148 | 4.80 | 225.3 | 46.9 | 0.9451 | — | — | — |
| 32 | Hexane | 85 | 0 | 150 | 1796 | 422.4 | — | — | >0.9650 | — | — | — |
| 33 | Hexane | 85 | 0 | 300 | 1332 | >2000 | — | — | >0.9650 | — | — | — |
| 34 | Hexane | 75 | 0 | 5 | 4020 | — | 0.863 | — | 0.9516 | — | — | — |
| 35 | Hexane | 85 | 20 | 5 | 5393 | 2.64 | 91.49 | 34.7 | 0.9196 | — | — | — |
| 36 | Hexane | 85 | 20 | 75 | 5813 | 2343 | — | — | 0.9120 | — | — | — |
| 37* | Hexane | 85 75 | 0 0 | 150 5 | 2839 | 0.075 | 33.21 | 442.8 | 0.9629 | 6053 | 207585 | 34.29 |

TABLE 9-continued

Polymerization and PE Characterization Data

| Ex. No. | Diluent | T °C. | 1-Butene mL | H$_2$ mmol | Activity g/g/hr | I$_2$ dg/min | I$_{21}$ dg/min | I$_{21}$/I$_2$ | Density d/mL | Mn, g/mole | Mw, g/mole | Mw/Mn |
|---|---|---|---|---|---|---|---|---|---|---|---|---|
| 38* | Hexane | 85 | 0 | 300 | 2414 | 181.6 | — | — | 0.9461 | — | — | — |
|  |  | 85 | 20 | 5 |  |  |  |  |  |  |  |  |

*Polymerizations were carried out under bimodal conditions

As the data in Table 9 show, catalyst activities in both HFC-245fa and hexane are similar. Ethylene polymers produced in HFC-245fa have lower melt indexes than those produced in hexane, indicating less polymer extraction in HFC-245fa diluent.

Figure 3:
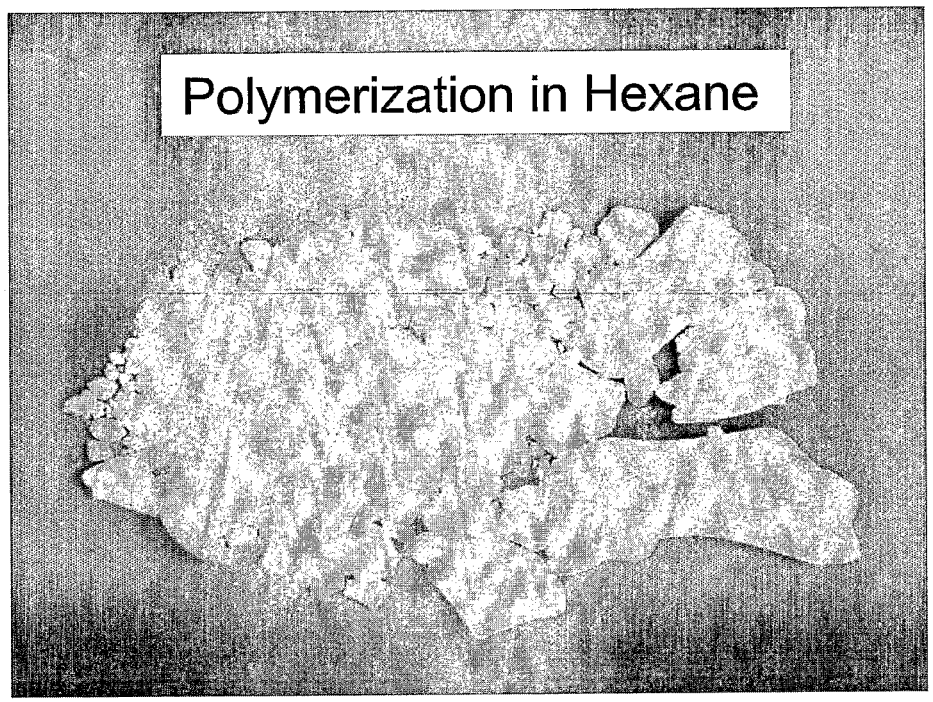
FIG. 3 shows the morphology of the polymer product produced using a saturated hydrocarbon diluent.
Figure 4:
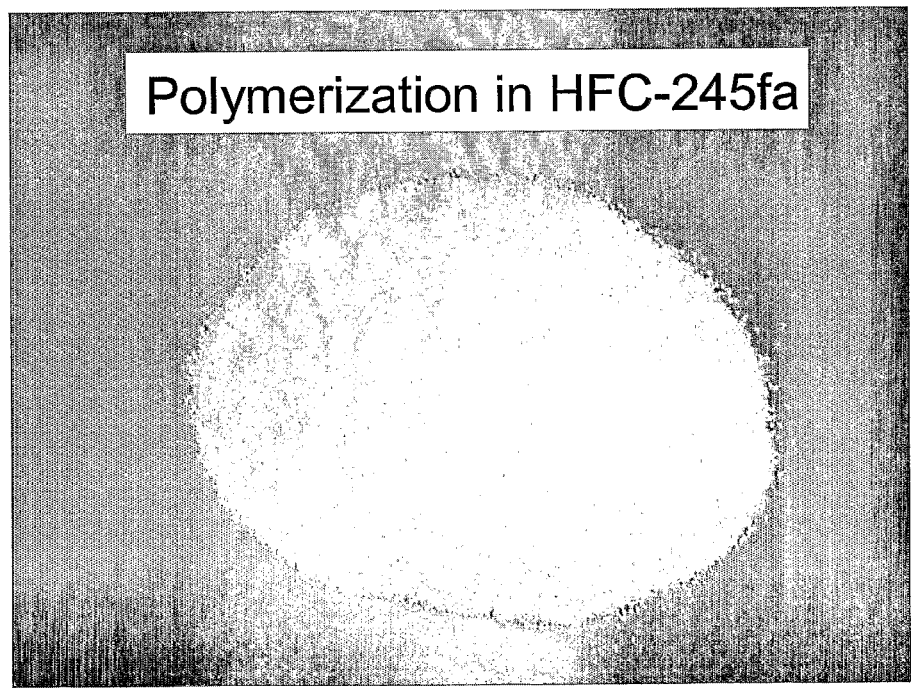
FIG. 4 shows the improved morphology of the polymer product produced using an HFC.

The polymers produced in HFC also have the more desirable granular morphology, compared to the clumpy morphology produced in hexane. FIG. 4 shows the improved morphology of the polymer product produced using an HFC as compared to FIG. 3 showing the morphology of the polymer product produced using a saturated hydrocarbon diluent.

Having now fully described this invention, it will be appreciated by those skilled in the art that the invention can be performed within a wide range of parameters within what is claimed, without departing from the spirit and scope of the invention. All documents described herein are incorporated by reference herein, including any priority documents and/or testing procedures, tot he extent that they are not inconsistent with the disclosure herein.

All documents described herein are incorporated by reference herein, including any priority documents and/or testing procedures, to the extent that they are not inconsistent with the disclosure herein.

We claim:

1. A process for producing polymer comprising polymerizing 70% by weight or more ethylene and optionally one or more comonomers in the presence of a Ziegler-Natta catalyst system and a diluent to form a slurry of polymer solids, wherein the diluent comprises at least 5 volume percent of a fluorinated hydrocarbon based on the total volume of the diluent, wherein:
   said process is conducted at a temperature of greater than or equal to 30° C.;
   the fluorinated hydrocarbon is not a perfluorinated C$_4$ to C$_{10}$ alkane;
   the polymer has a melting temperature of greater than or equal to 75° C.; and
   the catalyst may be supported or unsupported and when supported the molar ratio of the fluorinated hydrocarbon to the Ziegler-Natta transition metal component is greater than 500:1.

2. The process of claim 1 wherein the catalyst is supported.

3. The process of claim 1 wherein the catalyst is unsupported.

4. The process of claim 1 wherein the fluorinated hydrocarbon is represented by the formula: C$_x$H$_y$F$_z$ wherein x is an integer from 1 to 40, and y and z are integers of at least one.

5. The process of claim 4 wherein x is an integer in the range of from 1 to 10.

6. The process of claim 1 wherein the diluent further comprises at least one C$_1$ to C$_8$ alkane.

7. The process of claim 1 wherein the diluent comprises a mixture of at least one saturated hydrocarbon and at least one fluorinated hydrocarbon wherein the mixture has a density in the range of from 0.2 g/cc less than to 0.2 g/cc greater than the density of the polymer.

8. The process of claim 1 wherein the diluent comprises a mixture of at least one saturated hydrocarbon and at least one fluorinated hydrocarbon and the fluorinated hydrocarbon comprises greater than 1 weight percent of the mixture.

9. The process of claim 8 wherein the fluorinated hydrocarbon comprises greater than 5 weight percent of the mixture.

10. The process of claim 1 wherein the diluent comprises a mixture of at least one saturated hydrocarbon and at least one fluorinated hydrocarbon and the fluorinated hydrocarbon comprises greater than 1 volume percent of the mixture.

11. The process of claim 10 wherein the fluorinated hydrocarbon comprises greater than 5 volume percent of the mixture.

12. The process of claim 1 wherein ethylene comprises 50 weight % or more of the total weight of ethylene and comonomer polymerized.

13. The process of claim 1 wherein ethylene comprises 75 weight % or more of the total weight of ethylene and comonomer polymerized.

14. The process of claim 1 wherein the polymer has a melting temperature of greater than or equal to 110° C.

15. The process of claim 1 wherein the polymer has a melting temperature of greater than or equal to 95° C.

16. The process of claim 1 wherein the polymer has a heat of fusion greater than or equal to 10 J/g.

17. The process of claim 1 wherein the polymer has a heat of fusion greater than or equal to 70 J/g.

18. The process of claim 1 wherein the polymer has a heat of fusion greater than or equal to 100 J/g.

19. The process of claim 1 wherein the polymer has a heat of fusion greater than or equal to 130 J/g.

20. The process of claim 1 wherein the polymer has crystallinity derived from ethylene incorporation of greater than or equal to 10%.

21. The process of claim 1 wherein the polymer has crystallinity derived from ethylene incorporation of greater than or equal to 50%.

22. The process of claim 1 wherein the one or more comonomers contain olefinic unsaturation and are capable of insertion polymerization.

23. The process of claim 22 wherein the one or more comonomers are selected from linear, branched, or ring-containing olefins having up to 30 carbon atoms, and combinations thereof.

24. The process of claim 23 wherein the one or more comonomers selected from linear or branched C$_3$ to C$_{20}$ alpha olefins.

25. The process of claim 23 wherein the one or more comonomers selected from linear C$_3$ to C$_8$ alpha olefins.

26. The process of claim 22 wherein the one or more comonomers include at least one polyene.

27. The process of claim 1 wherein the process is carried out in a loop reactor.

28. The process of claim 1 wherein the process is carried out in a stirred tank reactor.

29. The process of claim 1, further comprising continuously discharging a portion of the slurry from the reactor as polymerization effluent.

30. The process of claim 29 further comprising flashing the polymerization effluent in a first flash to vaporize from about 50% to about 100% of the liquid medium to produce concentrated polymer effluent and vaporized liquid.

31. The process of claim 30 further comprising condensing the vapor obtained in the first flash without compression.

32. The process of claim 31 further comprising operating the reactor at a space time yield greater than 2.6 lbs/hr-gal.

33. The process of claim 32 wherein the reactor is operated at a space time yield greater than 3.0 lbs/hr-gal.

34. The process of claim 33 wherein the reactor is operated at a space time yield greater than 3.3 lbs/hr-gal.

35. The process of claim 30 further comprising discharging from the first flash polymer solids to a second flash through a seal chamber of sufficient dimension such as to maintain a volume of polymer solids/slurry in the seal chamber sufficient to maintain a pressure seal.

36. The process of claim 7, wherein the volume percent solids in the polymerization slurry in the reactor is greater than 50.

37. The process of claim 36 wherein the volume percent solids in the polymerization slurry in the reactor is greater than 60.

38. The process of claim 37 wherein the volume percent solids in the polymerization slurry in the reactor is greater than 70.

39. The process of claim 30 wherein the first flash is operated at from about 140 psia to about 315 psia.

40. The process of claim 30 wherein the concentrated polymer effluent and vaporized liquid are continuously separated.

41. The process of claim 30 wherein the concentrated polymer effluent slurry is flashed in a second flash to vaporize liquid.

42. The process of claim 30 wherein the vapor from the first flash is condensed by heat exchange.

43. The process of claim 27, wherein the polymerization slurry is circulated within the loop reactor by multiple pumps and wherein the reactor volume is greater than 20,000 gallons.

44. The process of claim 30 further comprising heating the polymerization effluent.

45. The process of claim 44 wherein the polymerization effluent is heated to a temperature below the fusion temperature of the polymer.

46. The process of claim 45 wherein the quantity of heat supplied to the polymerization effluent is at least equal to that quantity of heat which equals the heat of vaporization of the liquid medium which is to be flashed in the first flash.

47. The process of claim 29 wherein the polymer solids are separated from the diluent with a centrifuge apparatus.

48. The process of claim 1 wherein the polymerization is carried out at a temperature of from 30° C. to about 200° C.

49. The process of claim 1 wherein the polymerization is carried out at a temperature of from greater than 30° C. to about 180° C.

50. The process of claim 1 wherein the polymerization is carried out at a pressure of from 1 to 100 atmospheres.

51. The process of claim 1, wherein the Ziegler-Natta catalyst system contains one or more alkali earth or alkali metal compounds.

52. The process of claim 51, wherein the Ziegler-Natta catalyst is supported.

53. The process of claim 1, wherein the Ziegler-Natta catalyst is unsupported.

54. The process of claim 1, wherein the Ziegler-Natta catalyst system further comprises an alkylalumoxane activator.

\* \* \* \* \*